(12) United States Patent
Hwang

(10) Patent No.: US 9,841,841 B2
(45) Date of Patent: Dec. 12, 2017

(54) TOUCH CONTROLLER, TOUCH SENSING DEVICE, AND TOUCH SENSING METHOD

(71) Applicant: SAMSUNG ELECTRONICS CO., LTD., Suwon-si, Gyeonggi-Do (KR)

(72) Inventor: Hee-Chang Hwang, Asan-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 121 days.

(21) Appl. No.: 14/978,588

(22) Filed: Dec. 22, 2015

(65) Prior Publication Data

US 2016/0202839 A1    Jul. 14, 2016

(30) Foreign Application Priority Data

Jan. 14, 2015  (KR) .................. 10-2015-0006979

(51) Int. Cl.
G06F 3/041 (2006.01)
G06F 3/044 (2006.01)

(52) U.S. Cl.
CPC ............ *G06F 3/0418* (2013.01); *G06F 3/044* (2013.01); *G06F 3/0416* (2013.01)

(58) Field of Classification Search
CPC ...... G06F 3/0416; G06F 3/044; G06F 3/0412; G06F 3/0488
See application file for complete search history.

(56) References Cited

U.S. PATENT DOCUMENTS

| | | | |
|---|---|---|---|
| 7,084,860 B1 | 8/2006 | Jaeger et al. | |
| 8,334,851 B2 | 12/2012 | Harada et al. | |
| 8,558,811 B2 | 10/2013 | Reynolds | |
| 8,648,835 B2 | 2/2014 | Rapakko | |
| 2002/0050983 A1 | 5/2002 | Liu et al. | |
| 2008/0238879 A1 | 10/2008 | Jaeger et al. | |
| 2011/0042152 A1 | 2/2011 | Wu | |
| 2011/0042153 A1 | 2/2011 | Wu et al. | |
| 2011/0063993 A1 | 3/2011 | Wilson et al. | |
| 2012/0182259 A1 | 7/2012 | Han | |
| 2012/0256855 A1 | 10/2012 | Chan et al. | |
| 2012/0319988 A1 | 12/2012 | Schwartz | |
| 2013/0069894 A1* | 3/2013 | Chen | G06F 3/0412 345/173 |
| 2013/0106779 A1 | 5/2013 | Company Bosch et al. | |

(Continued)

FOREIGN PATENT DOCUMENTS

JP  07-114441  5/1995
KR  1020110001897  1/2011

(Continued)

*Primary Examiner* — Gerald Johnson
(74) *Attorney, Agent, or Firm* — F. Chau & Associates, LLC

(57) ABSTRACT

A touch controller includes a driving signal transmitter and a sensing signal receiver. The driving signal transmitter is configured to generate a driving signal by spreading a frequency of an input signal to a first frequency and a second frequency. The first frequency is higher than a preset carrier frequency and the second frequency is less than the carrier frequency. The driving signal transmitter inputs the driving signal to a touch panel. The sensing signal receiver is configured to receive a sensing signal generated in the touch panel based on the driving signal and generate touch data based on the sensing signal.

20 Claims, 29 Drawing Sheets

(56) References Cited

U.S. PATENT DOCUMENTS

| | | | |
|---|---|---|---|
| 2013/0147758 A1* | 6/2013 | Chang | G06F 3/0416 |
| | | | 345/174 |
| 2013/0221993 A1 | 8/2013 | Ksondzyk et al. | |
| 2013/0257765 A1* | 10/2013 | Lee | G06F 3/0418 |
| | | | 345/173 |
| 2013/0293511 A1 | 11/2013 | Nam | |
| 2013/0300690 A1 | 11/2013 | Yang et al. | |
| 2013/0321326 A1 | 12/2013 | Kwon et al. | |
| 2014/0022203 A1 | 1/2014 | Karpin et al. | |
| 2014/0049266 A1 | 2/2014 | Heim et al. | |
| 2014/0168145 A1* | 6/2014 | Reynolds | G06F 3/041 |
| | | | 345/174 |
| 2015/0109212 A1* | 4/2015 | Yao | G06F 3/044 |
| | | | 345/173 |
| 2015/0109244 A1* | 4/2015 | Jang | G06F 3/0416 |
| | | | 345/174 |

FOREIGN PATENT DOCUMENTS

| | | |
|---|---|---|
| KR | 1020120082207 | 7/2012 |
| KR | 1020130120139 | 11/2013 |

\* cited by examiner

| Ftx(kHz) | 375kHz |
|---|---|
| Average | 413.0 |
| Min | 313 |
| Max | 457 |
| Max/Min Ratio | 1.5 |

| Ftx(kHz) | 375kHz |
| --- | --- |
| Average | 417.2 |
| Min | 327 |
| Max | 456 |
| Max/Min Ratio | 1.39 |
| Fdodge(kHz) | 375±62.5 |

TOUCH CONTROLLER, TOUCH SENSING DEVICE, AND TOUCH SENSING METHOD

CROSS-REFERENCE TO RELATED APPLICATION

This application claims priority under 35 U.S.C. §119 to Korean Patent Application No. 10-2015-0006979, filed on Jan. 14, 2015, in the Korean Intellectual Property Office, the disclosure of which is incorporated by reference in its entirety herein.

BACKGROUND

1. Technical Field

The inventive concept relates to a touch sensing system, and more particularly, to a touch controller capable of improving a sensing sensitivity of a touch sensing device, a touch sensing device including the touch controller, and a touch sensing method.

2. Discussion of Related Art

A touch panel is an input device used by a user to input a command by selecting an indication displayed on a screen of a display device via one or more fingers or a touch pen. Since the touch panel enables the user to quickly and easily interact with the content displayed on the screen, compared to using a mouse or a keyboard, the touch panel is used in various display devices due to its increased convenience. In a capacitive touch panel, when a finger or a touch pen approaches or contacts the touch panel, a capacitance value of a plurality of sensing units included in the touch panel is changed. Thus, it is possible to sense the generation of a touch and a position of the touch using the changed capacitance value. However, noise in touch data received from the touch panel can cause an error in the generated position or prevent a touch from being registered. Thus, there is a need for a touch controller and method of driving the same that is less susceptible to the deleterious effects of noise.

SUMMARY

At least one embodiment of the inventive concept provides a touch sensing controller capable of improving a touch sensitivity of a touch sensing device, a touch sensing device including the touch controller, and a touch sensing method.

According to an exemplary embodiment of the inventive concept, there is provided a touch controller including: a driving signal transmitter and a sensing signal receiver. The driving signal transmitter is configured to generate a driving signal by spreading a frequency of an input signal to a first frequency and a second frequency. The first frequency is higher than a preset carrier frequency. The second frequency is less than the carrier frequency. The driving signal transmitter is configured to input the driving signal to a touch panel. The sensing signal receiver is configured to receive a sensing signal generated in the touch panel based on the driving signal and generate touch data based on the sensing signal.

According to an exemplary embodiment of the inventive concept, there is provided a touch sensing device including: a touch panel comprising a first electrode and a second electrode to sense a touch input; and a touch controller configured to generate a driving signal by encoding and modulating an input signal based on a code signal and a carrier signal and sense a touch of the touch panel based on the driving signal. The touch controller is configured to spread a frequency of the input signal according to a frequency of the code signal with respect to the carrier frequency.

According to an exemplary embodiment of the inventive concept, there is provided a touch sensing method including: generating a driving signal by spreading a frequency of an input signal to a first frequency and a second frequency, where the first frequency is higher than a preset carrier frequency and the second frequency is less than the carrier frequency; sensing a touch on a touch panel based on the driving signal to generate a sensing signal; and generating touch data based on the sensing signal received from the touch panel.

According to an exemplary embodiment of the inventive concept, there is provided a touch controller for a touch panel. The touch controller includes a receiver, a noise analysis circuit, a frequency adjustment circuit, and a transmitter. The receiver is configured to receive a sensing signal from the touch panel and derive touch data from the sensing signal. The noise analysis circuit is configured to determine an amount of noise in the touch data. The frequency adjustment circuit is configured to change a dodging frequency when the amount is less than a reference amount and otherwise maintains the dodging frequency. The transmitter is configured to perform a frequency spreading on an input signal using the dodging frequency to generate a driving signal for application to the touch panel.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION

Figure 1:
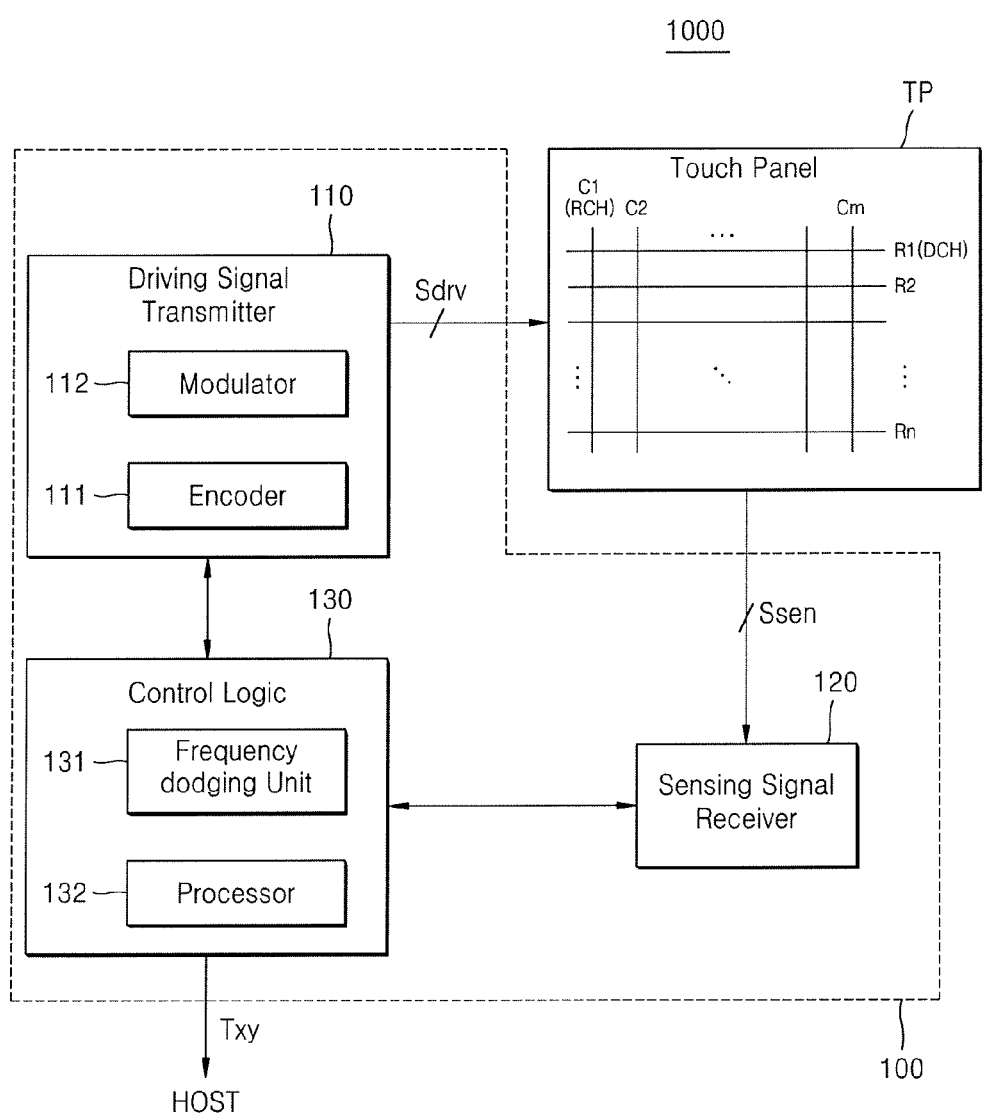
FIG. 1 is a block diagram illustrating a touch sensing device according to an exemplary embodiment of the inventive concept.

The present inventive concept will now be described more fully with reference to the accompanying drawings, in which exemplary embodiments of the inventive concept are shown. The inventive concept may, however, be embodied in many different forms, and should not be construed as being limited to the embodiments set forth herein. Thus, the inventive concept may include all revisions, equivalents, or substitutions which are included in the concept and the technical scope related to the present inventive concept. Like reference numerals in the drawings denote like elements.

In the present specification, when a constituent element is "connected" or "coupled" to another constituent element, it may be construed that the constituent element is connected or coupled to the other constituent element not only directly but also through at least one of other constituent elements interposed therebetween.

Singular expressions, unless defined otherwise in contexts, include plural expressions. For example, the singular forms "a", "an" and "the" are intended to include the plural forms as well, unless the context clearly indicates otherwise.

FIG. 1 is a block diagram illustrating a touch sensing device 1000 according to an exemplary embodiment of the inventive concept.

Referring to FIG. 1, the touch sensing device 1000 includes a touch panel TP and a touch controller 100. In an embodiment, the touch panel TP is a capacitive touch panel.

The touch panel TP operates in response to a driving signal Sdrv and a touch input, and generates a capacitance signal corresponding to the touch input. The touch input includes not only a direct touch of a conductive object such as finger, a touch pen or a stylus pen on the touch panel TP but also an approach of the conductive object to the touch panel TP. For example, a touch input may be recognized when the conductive object is moved to be within a certain distance of the touch panel TP without directly touching a surface of the touch panel TP.

The touch panel TP includes row channels R1 through Rn arranged in a first direction and column channels C1 through Cm arranged in a second direction crossing the first direction. The row channels R1 through Rn and the column channels C1 through Cm may be together referred to as a sensing array. Each of the row channels R1 through Rn and the column channels C1 through Cm may include a plurality of electrodes that are electrically connected to one another, and the plurality of electrodes may be referred to as sensing units.

According to an exemplary embodiment, the row channels R1 through Rn are driving channels DCH, and the column channels C1 through Cm are sensing channels RCH. The driving channels DCH may include a plurality of drive electrodes (not shown) that are electrically connected to one another. The sensing channels RCH may include a plurality of sensing electrodes (not shown) that are electrically connected to one another. The drive electrodes and the sensing electrodes may be referred to as sensing units. A capacitor may be formed between the drive electrodes and the sensing electrodes, and capacitance of the capacitor may be changed according to a touch input.

According to an exemplary embodiment, the row channels R1 through Rn and the column channels C1 through Cm are each a driving channel and a sensing channel. Each of the electrodes included in the row channels R1 through Rn and the column channels C1 through Cm forms a capacitor (e.g., a floating capacitor) with respect to peripheral conductors, and capacitance of the capacitor may be changed according to a touch input.

The touch panel TP provides a sensing signal Ssen to the touch controller 100 corresponding to a variation in capacitance.

The touch controller 100 may detect whether a touch input is generated in the touch panel TP and a position where the touch input is applied. The touch controller 100 applies a driving signal Sdrv to the touch panel TP, and senses a touch input based on the driving signal Sdrv to generate touch data. The touch controller 100 includes a driving signal transmitter 110, a sensing signal receiver 120, and control logic 140.

The driving signal transmitter 110 may transmit a driving signal Sdrv to a plurality of driving channels DCH formed on the touch panel TP. The number of driving signals Sdrv may be determined based on the number of driving channels DCH formed on the touch panel TP. According to an exemplary embodiment, the driving signal transmitter 110 transmits a plurality of driving signals Sdrv sequentially to corresponding driving channels DCH. According to an exemplary embodiment, the driving signal transmitter 110 transmits a plurality of driving signals Sdrv coded to a plurality of orthogonal signals respectively corresponding to a plurality of driving channels DCH simultaneously to corresponding driving channels DCH.

In an embodiment, the driving signal transmitter 110 generates a driving signal Sdrv by spreading a frequency of an input signal to a first frequency which is higher than a preset carrier frequency and to a second frequency which is lower than the carrier frequency. A frequency difference between the carrier frequency and the first frequency or a frequency difference between the carrier frequency and the second frequency may be referred to as a dodging frequency.

According to an exemplary embodiment, the input signal is a base band signal. In an embodiment, a base band signal is a signal transmitted without modulation, that is, without any shift in the range of frequencies of the signal.

According to an exemplary embodiment, a frequency difference between a carrier frequency and the first frequency is the same as a frequency difference between the carrier frequency and the second frequency. According to an exemplary embodiment, the dodging frequency is set based on a spectrum of noise generated in the touch panel TP to prevent a noise component included in a frequency band of the carrier frequency from being sensed, from among noise generated in the touch panel TP. According to an exemplary embodiment, the first frequency or the second frequency is set such that a power spectral density of noise (e.g., also referred to as noise spectral density) at the first frequency or the second frequency is smaller than a preset reference value. In an embodiment, noise spectral density is the noise per unit of bandwidth having a dimension of power/frequency (e.g., watts per hertz).

The driving signal transmitter 110 includes an encoder 111 and a modulator 112. The encoder 111 may encode an input signal based on a code signal. A code signal may be a periodic signal having a predetermined frequency. According to an exemplary embodiment, a code signal is a periodic signal having the dodging frequency described above. According to an exemplary embodiment, a frequency of a code signal is varied as an interval between codes of the code signal is varied. According to an exemplary embodiment, a code signal may include a first signal and a second signal having a negative value with respect to a value of the first signal, and the first signal and the second signal in the code signal may be alternately arranged at predetermined intervals, for example, at predetermined time periods.

The modulator 112 may modulate a frequency of an input signal, for example, an encoding signal provided by the encoder 111, based on a carrier signal having a carrier frequency. Accordingly, the input signal which has a low frequency may be converted to a high-frequency signal that is appropriate for transmission. A carrier frequency may be preset by considering physical characteristics of the touch panel TP. In an embodiment, the carrier frequency is higher than a frequency of the encoding signal. For example, the carrier frequency may be several tens of KHz to several hundreds of KHz.

According to an exemplary embodiment of the inventive concept, the driving signal transmitter 110 encodes an input signal based on a code signal having a dodging frequency, to spread a frequency of the input signal to the dodging frequency, and modulate the frequency-spread signal based on a carrier signal to thereby generate a driving signal Sdrv whose frequency is spread, with respect to the carrier frequency, in a positive direction and a negative direction due to the dodging frequency.

According to an exemplary embodiment, after modulating a frequency of an input signal based on a carrier signal, the modulated input signal is encoded based on a code signal to thereby generate the driving signal Sdrv.

The sensing signal receiver 120 receives a sensing signal Ssen generated in the touch panel TP based on a driving signal Sdrv, and generates touch data based on the sensing signal Ssen. The touch data may be a value indicating a change in capacitance of each point on the touch panel TP.

According to an exemplary embodiment, the sensing signal receiver 120 has a transfer function corresponding to a transfer function of the driving signal transmitter 110. The sensing signal receiver 120 may be formed of a matched filter having substantially the same transfer function as a transfer function of the driving signal transmitter 110 or a transfer function contained in a driving signal Sdrv.

The control logic 130 may control an overall operation of the touch controller 100 related to touch sensing. The control logic 130 may control operations of the driving signal transmitter 110 and the sensing signal receiver 120. Also, the control logic 130 may calculate touch coordinates Txy and provide the touch coordinates Txy to a host.

The control logic 130 includes a frequency dodging unit 131 (e.g., a circuit) and a processor 132. The frequency dodging unit 131 may determine a dodging frequency used in generating a driving signal Sdrv. A dodging frequency refers to a frequency used to spread a frequency of an input signal, and may be a difference between a carrier frequency and a first frequency or a difference between the carrier frequency and a second frequency as described above.

The frequency dodging unit 131 may determine a dodging frequency based on touch data received from the sensing signal receiver 120. According to an exemplary embodiment, the frequency dodging unit 131 analyzes noise generated in the touch panel TP, and determines a dodging frequency based on the analyzed noise such that a frequency component of a driving signal Sdrv avoids a frequency with a large noise, based on a carrier frequency and a frequency component of the noise.

The processor 132 may calculate touch coordinates Txy based on touch data received from the sensing signal receiver 120. The processor 132 may calculate touch coordinates Txy based on various algorithms. The processor 132 may calculate touch coordinates Txy according to a single touch. Also, the processor 132 may calculate a plurality of touch coordinates Txy according to multiple touches.

A structure and an operation of the driving signal transmitter 110, the sensing signal receiver 120, and the frequency dodging unit 131 included in the touch controller 100 according to an exemplary embodiment of the inventive concept will be described in detail later with reference to FIGS. 6 through 21.

In the touch sensing device 1000 according to an embodiment of the inventive concept, the touch controller 100 encodes and modulates an input signal based on a code signal and a carrier signal to generate a driving signal Sdrv having a first frequency and a second frequency that are spread to two sides of a carrier frequency of the carrier signal by a dodging frequency, and senses a touch input on the touch panel TP based on the driving signal Sdrv.

Accordingly, the touch sensing device 1000 may avoid or reduce noise within a signal band of the touch sensing device 1000 (hereinafter referred to as 'in-band noise') without changing a carrier frequency or increasing a sensing time. In-band noise refers to noise generated within a pass-band of the touch sensing device 1000 including the carrier frequency, and the pass-band may be a $1^{st}$ zero-crossing bandwidth, a half-power bandwidth, an equivalent bandwidth or a user-defined bandwidth.

Since the touch sensing device 1000 according to an exemplary embodiment of the inventive concept does not change a carrier frequency to avoid in-band noise, an additional operation that would otherwise need to be performed to change a carrier frequency is not performed. For example, an operation of detecting in advance physical characteristics of the touch panel TP with respect to a plurality of carrier frequencies which are to be changed, such as a transfer function, or an operation of analyzing a sensing signal in consideration of a change in response characteristics of a sensing signal due to a change in a carrier frequency, are not necessary. Also, since sensing time is not increased, a frame frequency of the touch panel TP is not reduced. Thus, according to the touch sensing device 1000 according to an exemplary embodiment of the inventive concept, in-band noise may be efficiently avoided and the sensing sensitivity may be improved.

Figure 2:
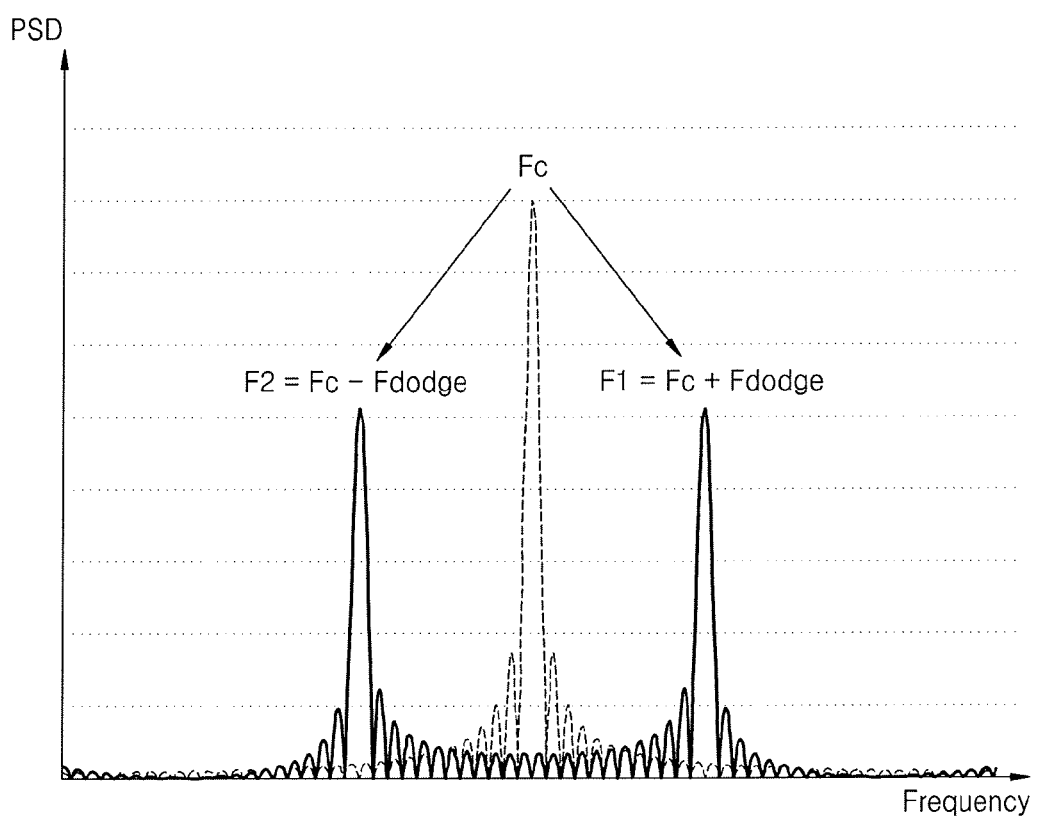
FIG. 2 is a graph showing a power spectrum density of a driving signal according to an exemplary embodiment of the inventive concept.

FIG. 2 is a graph showing a power spectral density of a driving signal according to an exemplary embodiment of the inventive concept.

Referring to FIG. 2, the touch sensing device 1000 (see FIG. 1) according to the inventive concept may prevent sensing of in-band noise by spreading a power spectral density PSD of a driving signal Sdrv to a first frequency F1 and a second frequency F2 located on two sides of a carrier frequency Fc. The power spectral density PSD of the driving signal Sdrv may be relatively high at the first frequency F1 corresponding to the carrier frequency Fc increased by a dodging frequency Fdodge and the second frequency F2 corresponding to the carrier frequency Fc reduced by the dodging frequency Fdodge. As the carrier frequency Fc is not changed, an additional operation to change the carrier frequency Fc is not necessary.

Figure 3:
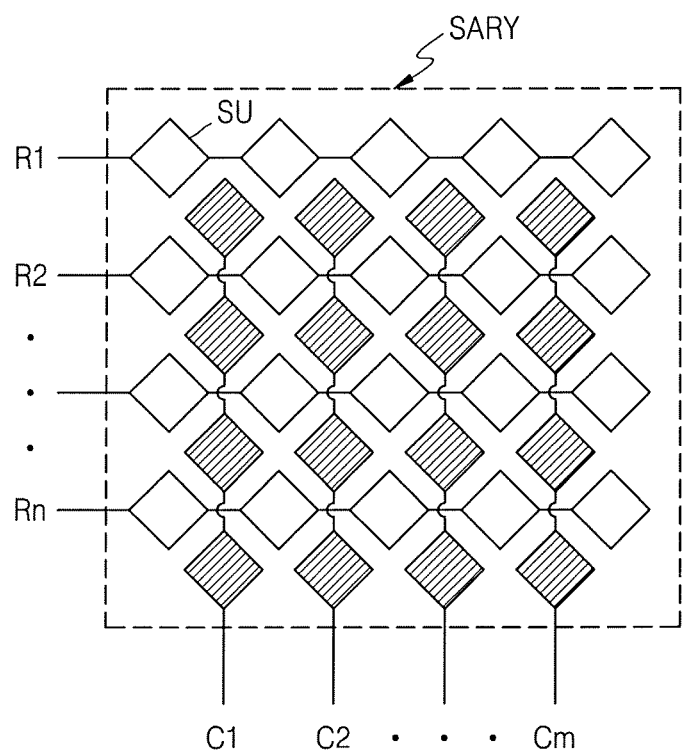
FIG. 3 illustrates a sensing array included in a touch panel of FIG. 1 according to an exemplary embodiment of the inventive concept.

FIG. 3 illustrates a sensing array SARY included in the touch panel TP of FIG. 1 according to an exemplary embodiment of the inventive concept.

Referring to FIG. 3, the sensing array SARY includes a plurality of row channels R1, R2, . . . , Rn, in each of which a plurality of sensing units SU are electrically connected to one another, and a plurality of column channels C1, C2, . . . , Cm, in each of which a plurality of sensing units SU are electrically connected to one another.

According to an exemplary embodiment, the touch panel TP (see FIG. 1) is a touch panel using a mutual capacitive method. For example, a plurality of row channels R1, R2, . . . , Rn may be driving channels DCH, and a plurality of column channels C1, C2, . . . , Cm may be sensing channels RCH. According to another example, a plurality of row channels R1, R2, . . . , Rn may be sensing channels RCH, and a plurality of column channels C1, C2, . . . , Cm may be driving channels DCH. Capacitors may be formed between sensing units SU included in the plurality of row channels R1, R2, . . . , Rn and sensing units SU included in the plurality of column channels C1, C2, . . . , Cm.

According to an exemplary embodiment, the touch panel TP (see FIG. 1) is a self-capacitive touch panel. A plurality of row channels R1, R2, . . . , Rn and a plurality of column channels C1, C2, . . . , Cm may each constitute a driving channel and a sensing channel at the same time. Capacitors may be formed between sensing units SU included in the plurality of row channels R1, R2, . . . , Rn and the plurality of column channels C1, C2, . . . , Cm and peripheral conductors.

According to an exemplary embodiment, the plurality of row channels R1, R2, . . . , Rn and the plurality of column channels C1, C2, . . . , Cm are formed in different layers from each other. According to an exemplary embodiment, the plurality of row channels R1, R2, . . . , Rn and the plurality of column channels C1, C2, . . . , Cm are formed in the same layer.

Figure 4A:
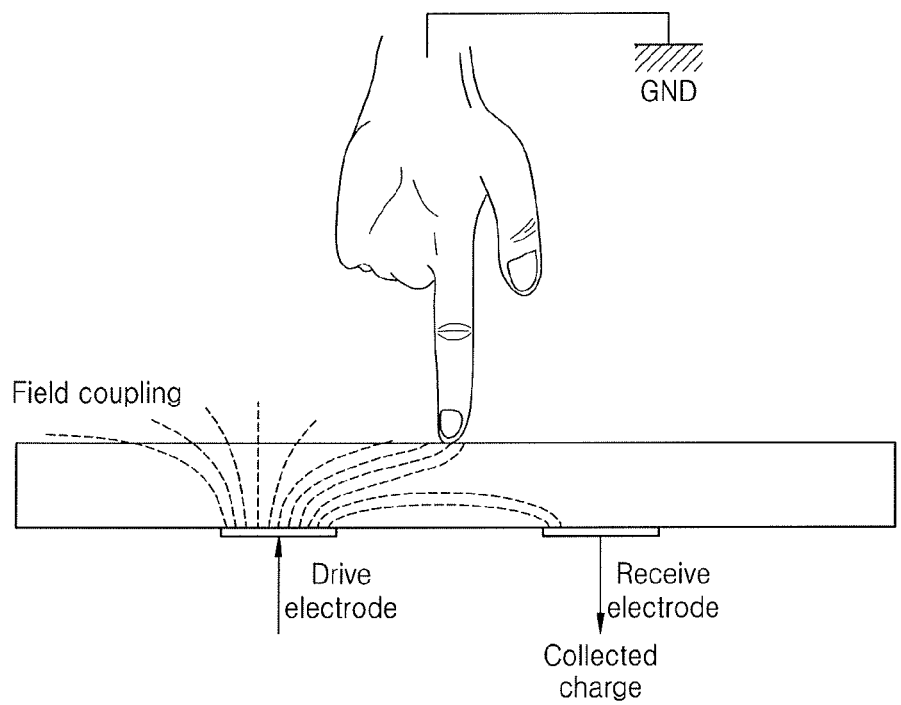
FIGS. 4A and 4B are diagrams for explaining variation in capacitance due to a touch.
Figure 4B:
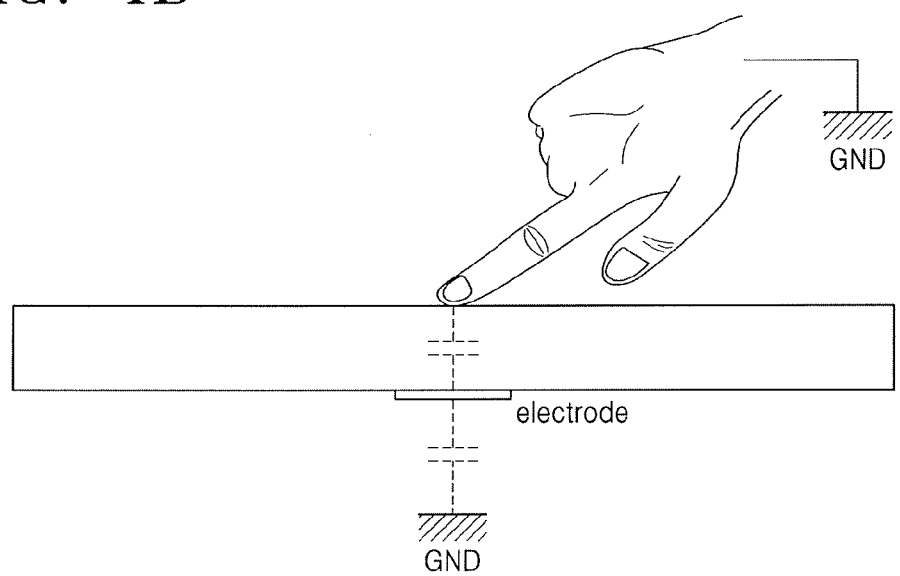

FIGS. 4A and 4B are diagrams for explaining variation in capacitance due to a touch. FIG. 4A is a diagram for explaining variation in capacitance when a mutual capacitive touch panel is used. FIG. 4B is a diagram for explaining variation in capacitance when a self capacitive touch panel is used.

Referring to FIG. 4A, according to a mutual capacitive method, a predetermined voltage pulse is applied to a drive electrode, and charges corresponding to the voltage pulse are collected in a receive electrode (or referred to as a sensing electrode).

If a user places a finger between two electrodes, an electrical field (dotted line) is changed. A variation in intensity of the electrical field causes a variation in a capacitance. Although FIG. 4 illustrates a contact touch (e.g., a direct touch), a variation in an electrical field is also caused by a proximity touch (e.g., finger/object is brought near surface of touch panel, but not into direct contact). Also, although FIGS. 4A and 4B illustrate a contact touch due to finger, a variation in an electrical field is caused also by touches via other conductors such as a touch pen. A variation of a capacitance between electrodes is caused by a variation in an electrical field between two electrodes, and a touch may be sensed based on the variation in the capacitance between the electrodes. However, sensing of a touch is not limited thereto. FIG. 4A illustrates that a variation in an electrical field due to a touch is sensed by a receive electrode, but the capacitance variation may be sensed by both electrodes.

Referring to FIG. 4B, according to a self capacitive method, a predetermined voltage pulse is applied to an electrode, and a voltage or a charge corresponding to the voltage pulse is collected from the electrode.

An electrode forms capacitance with a peripheral conductor (e.g., a ground node). Here, if a finger of a person (or other conductor) touches or approaches the electrode, capacitance may be increased. Variation in capacitance may be sensed from the electrode, and a touch may be sensed from the variation in capacitance.

Figure 5A:
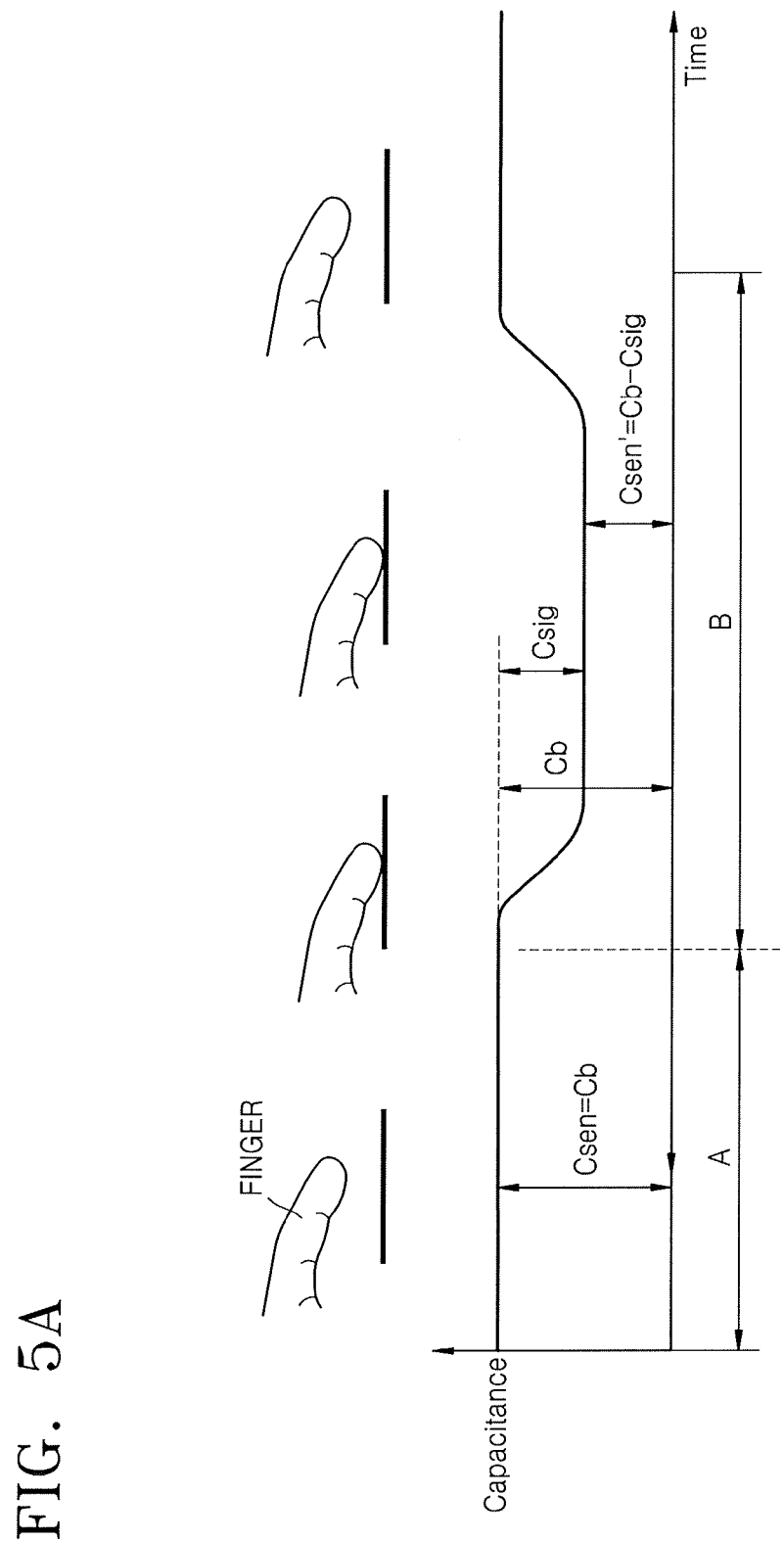
FIGS. 5A and 5B are graphs showing variation in an amount of capacitance due to a touch if noise is present.
Figure 5B:
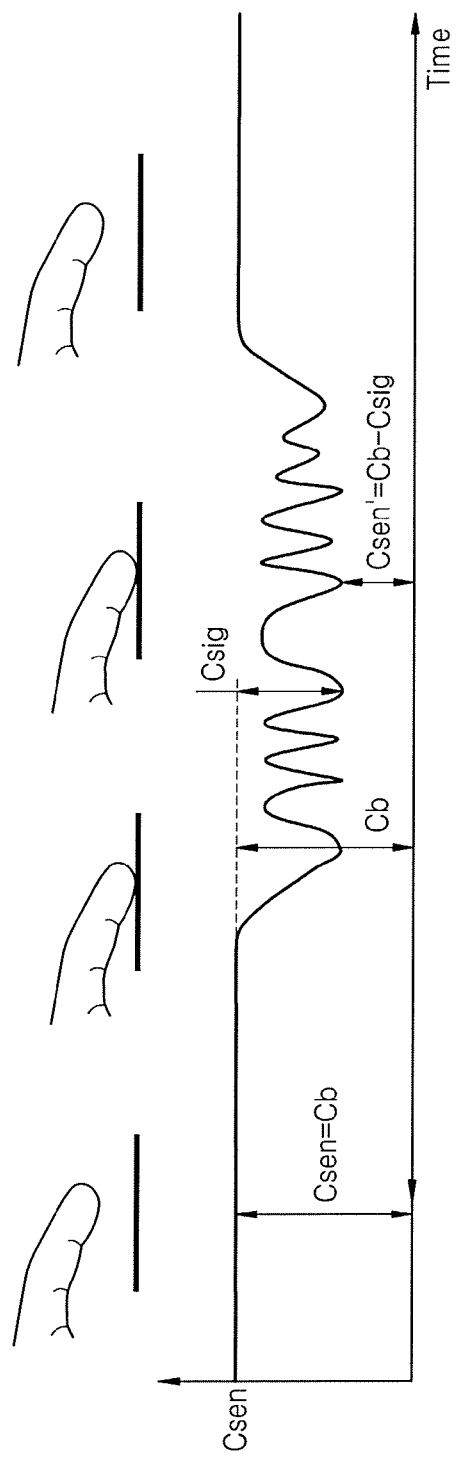

FIGS. 5A and 5B are graphs showing a variation in an amount of capacitance due to a touch if noise exists.

Referring to FIG. 5A, each sensing unit SU has a parasitic capacitance component Cb, and a capacitance value of each sensing unit SU may be varied due to an approach or contact of a conductive object such as finger or a touch pen. For example, as illustrated in FIG. 5A, if a conductive object approaches or contacts a sensing unit, a capacitance value of the sensing unit may be reduced. According to another example, if a conductive object approaches or contacts a sensing unit, a capacitance value of the sensing unit may be increased. For example, in the mutual capacitive touch panel illustrated in FIG. 4A, a capacitance value of a sensing unit due to an approach or contact of a conductive object may be reduced, and in the self capacitive touch panel of FIG. 4B, a capacitance value of a sensing unit may be increased due to an approach or contact of a conductive object.

A section A of FIG. 5A is a section where no conductive object is contacted, and a capacitance value Csen of a sensing unit may have a value Cb corresponding to a parasitic capacitance value. A section B of FIG. 5A corresponds to a section where a conductive object has contacted a sensing unit. If a conductive object such as finger approaches or contacts a sensing unit, a capacitance component Csig due to the finger is removed from the parasitic capacitance component Cb so that the capacitance value Csen may be reduced to a capacitance value Csen' overall as illustrated in FIG. 5A.

According to an exemplary embodiment, if a conductive object approaches or contacts a sensing unit, a capacitance component Csig due to the conductive object is added to the parasitic capacitance component Cb so as to increase a capacitance value.

If various noise is present as illustrated in FIG. 5B, a noise component may greatly affect a capacitance value and a touch may not be properly sensed because of a capacitance Csen' which fluctuates. In particular, a variation in a capacitance is sensed based on a driving signal Sdrv, and thus, if a noise component generated in a carrier frequency band, for example, in-band noise, is large, a sensing sensitivity may be reduced greatly.

However, if a frequency of a carrier signal is changed to a frequency with less noise to prevent degradation in sensing sensitivity, a variation in a gain of touch data of each node (channel) may be generated due to a response change of a transfer function of a path along which a driving signal Sdrv is applied to a touch panel TP to be output as a sensing signal Ssen, and gain deviation between nodes (channels) may be increased. Also, as the gain of touch data is decreased, a dynamic range of the touch data may be reduced.

If sensing time is increased to prevent degradation in sensing sensitivity, a frame frequency may be reduced.

In the touch sensing device 1000 including the touch controller 100, according to an exemplary embodiment of the inventive concept, flow of noise into the touch panel may be avoided and the sensing sensitivity may be improved while maintaining a sensing time without degrading a signal integrity by spreading a frequency of a driving signal to two sides of a carrier frequency and without changing a frequency of the carrier signal.

Figure 6:
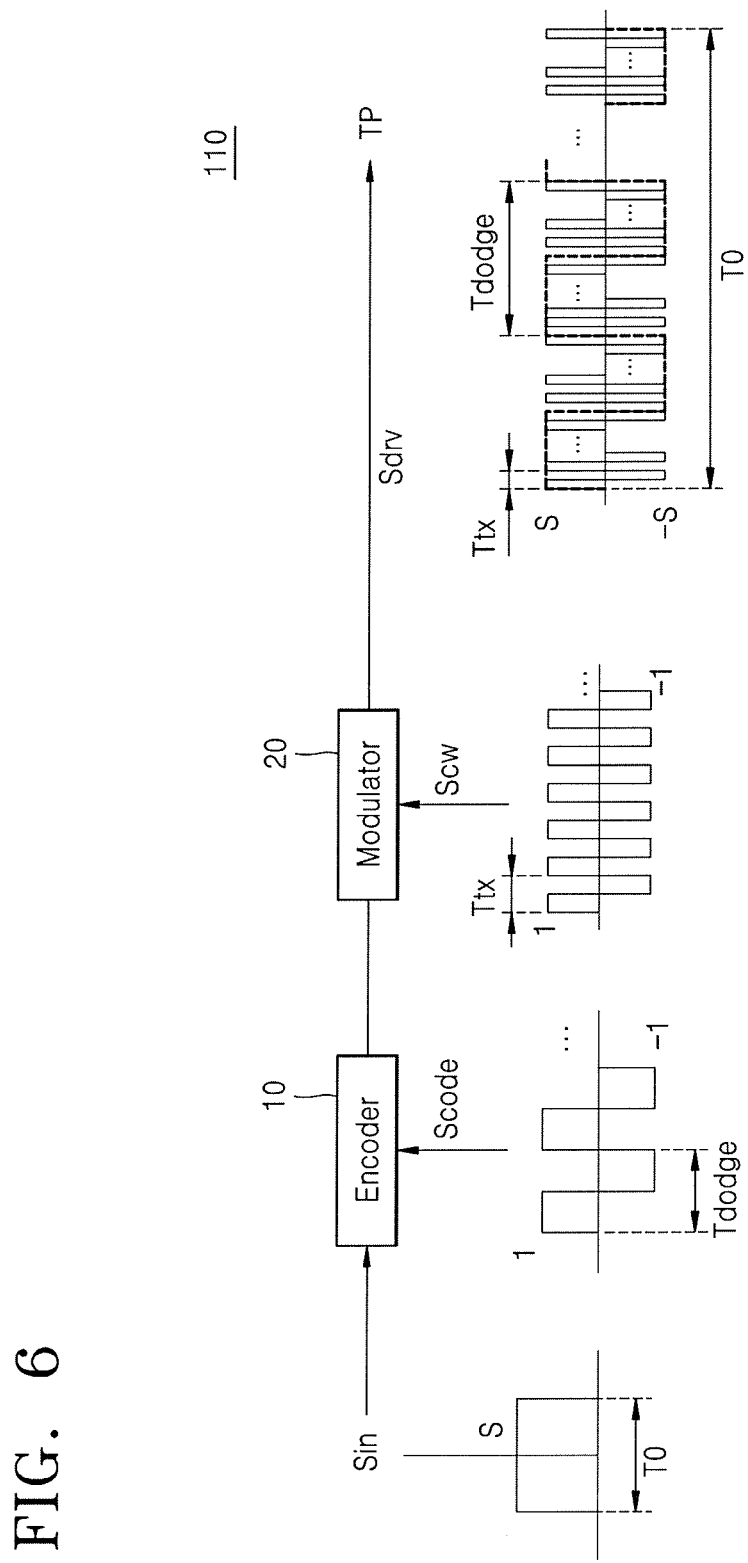
FIG. 6 is a block diagram illustrating a driving signal transmitter according to an exemplary embodiment of the inventive concept.

FIG. 6 is a block diagram illustrating a driving signal transmitter 110 according to an exemplary embodiment of the inventive concept.

Referring to FIG. 6, the driving signal transmitter 110 includes an encoder 10 and a modulator 20, and generates a driving signal Sdrv by encoding and modulating an input signal Sin.

The encoder 10 receives the input signal Sin and encodes the input signal Sin based on a code signal Scode. According to an exemplary embodiment, the code signal Scode is internally generated in the encoder 10.

Here, the input signal Sin may be a signal having a time length T0. For example, the input signal Sin may be a unit signal having a time length T0 and a voltage level S. The input signal Sin may be a square wave signal. For example, the input signal Sin may be a pulse with a time duration of T0.

The time length T0 may be preset based on a frame frequency and a resolution or the like of the touch panel TP (see FIG. 1). For example, if a frame frequency of the touch panel TP is 30 Hz, and a touch input is sensed as a driving signal Sdrv is sequentially applied to ten driving channels DCH (see FIG. 1), a time length T0 may be set to 3 ms. However, the inventive concept is not limited thereto. The time length T0 may be set in various manners. Also, physical characteristics and a driving method of the touch panel TP may be considered as an additional factor. The voltage level S may be set by considering the total power of an input signal Sin and the time length T0.

In an embodiment, a code signal Scode is a square pulse signal having a period Tdodge corresponding to a dodging frequency. According to an exemplary embodiment, a code signal Scode is a digital code signal with two data values of opposite logic levels, and code intervals of the code signal Scode vary according to the dodging frequency. For example, the dodging frequency may be derivable from the period of the code signal Scode.

The encoder 10 encodes an input signal Sin based on a code signal Scode indicating or having a dodging frequency Fdodge to generate an encoding signal having the dodging frequency Fdodge.

The modulator 20 modulates a frequency of the encoding signal received from the encoder 10 based on a carrier signal Scw to convert the encoding signal to a signal that is appropriate for transmission. The carrier signal Scw may be a square pulse signal having a period Ttx corresponding to a carrier frequency Ftx. According to an exemplary embodiment, a carrier signal Scw is a digital code signal with two data values of opposite logic levels and a length period Ttx of the carrier signal Scw varies according to a carrier frequency.

The driving signal Sdrv output by the modulator 20 may be, as illustrated in FIG. 6, a square pulse signal that has a time length T0, transitions between voltage levels S and −S at a period Ttx, and has a phase that changes by 180 degrees at half of a period Tdodge.

While FIG. 6 illustrates that the input signal Sin is applied to the encoder 10 to be encoded, and the encoded input signal is applied to the modulator 20 to be frequency-modulated, the inventive concept is not limited thereto. An order of encoding and modulation of an input signal Sin is not limited thereto. For example, after an input signal Sin is applied to the modulator 20 to be frequency-modulated, the frequency-modulated input signal may be applied to the encoder 10 to be encoded. Also, encoding and modulation may be simultaneously performed.

Figure 7:
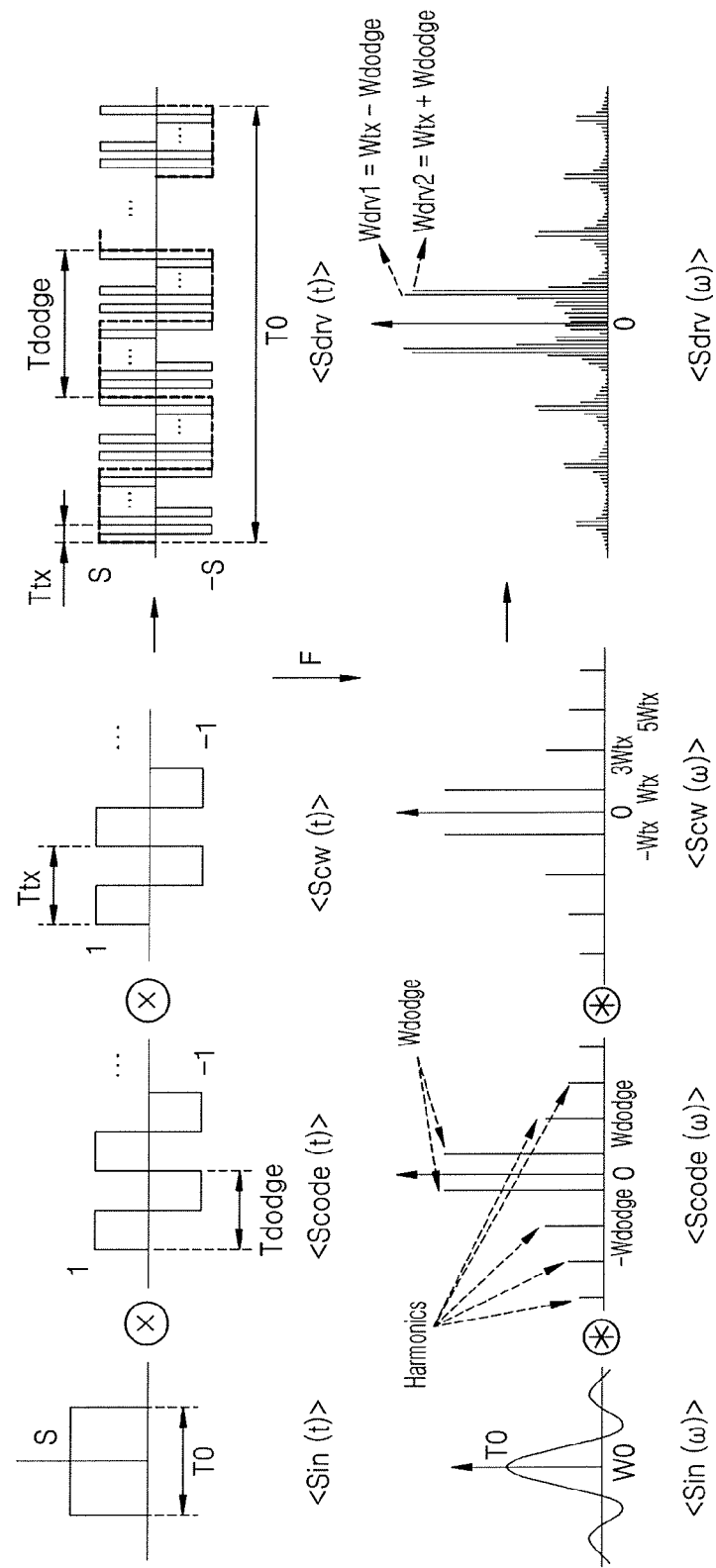
FIG. 7 is a graph showing a waveform of signals used in the driving signal transmitter of FIG. 6, in a time domain and a frequency domain.

FIG. 7 is a graph showing a waveform of signals used in the driving signal transmitter 110 of FIG. 6, in a time domain and a frequency domain.

Referring to FIG. 7, in a time domain, an input signal Sin(t), a code signal Scode(t), and a carrier signal Scw(t) are multiplied to generate a driving signal Sdrv(t) as illustrated. The input signal Sin(t), the code signal Scode(t), the carrier signal Scw(t), and the driving signal Sdrv(t) in the time domain may be expressed as signals in a frequency domain as illustrated in FIG. 7. The input signal Sin(W) may be expressed as in Equation 1.

$$\mathrm{Sin}(W) = T0 \frac{\sin(\pi W/W0)}{\pi W/W0} \quad \text{[Equation 1]}$$

The code signal Scode(W) may be expressed as in Equation 2.

$$Scode(W) = \sum_{k=-\infty}^{\infty} \frac{4}{jk} \delta(W - kWdodge) \quad \text{[Equation 2]}$$

Here, k is an odd number, and Wdodge denotes a dodging frequency (angular frequency, rad/s).

The carrier signal Scw(W) may be expressed as in Equation 3.

$$Scw(W) = \sum_{k=-\infty}^{\infty} \frac{4}{jk} \delta(W - kWtx)  \qquad \text{[Equation 3]}$$

Here, Wtx denotes a carrier frequency.

In a frequency domain, the input signal Sin(W), the code signal Scode(W), and the carrier signal Scw(W) are convoluted to generate a driving signal Sdrv(W), and the driving signal Sdrv(W) may be expressed as in Equation 4.

$$Sdrv(W) = \sum_{k=-\infty}^{\infty} \frac{4}{jk} Z(W - kWtx), \qquad \text{[Equation 4]}$$

$$Z(W) = Sin(W) * Scode(W)$$

A power spectral density of the driving signal Sdrv(w) is relatively high in a signal band of a first frequency Wdrv1 which is higher than a carrier frequency Wtx by a dodging frequency Wdodge and a second frequency Wdrv2 which is lower than the carrier frequency Wtx by the dodging frequency Wdodge. Thus, a frequency of the input signal Sin(W) is spread by the dodging frequency Wdodge with respect to the carrier frequency Wtx, thereby generating the driving signal Sdrv(w) having the first frequency Wdrv1 and the second frequency Wdrv2.

Figure 8:
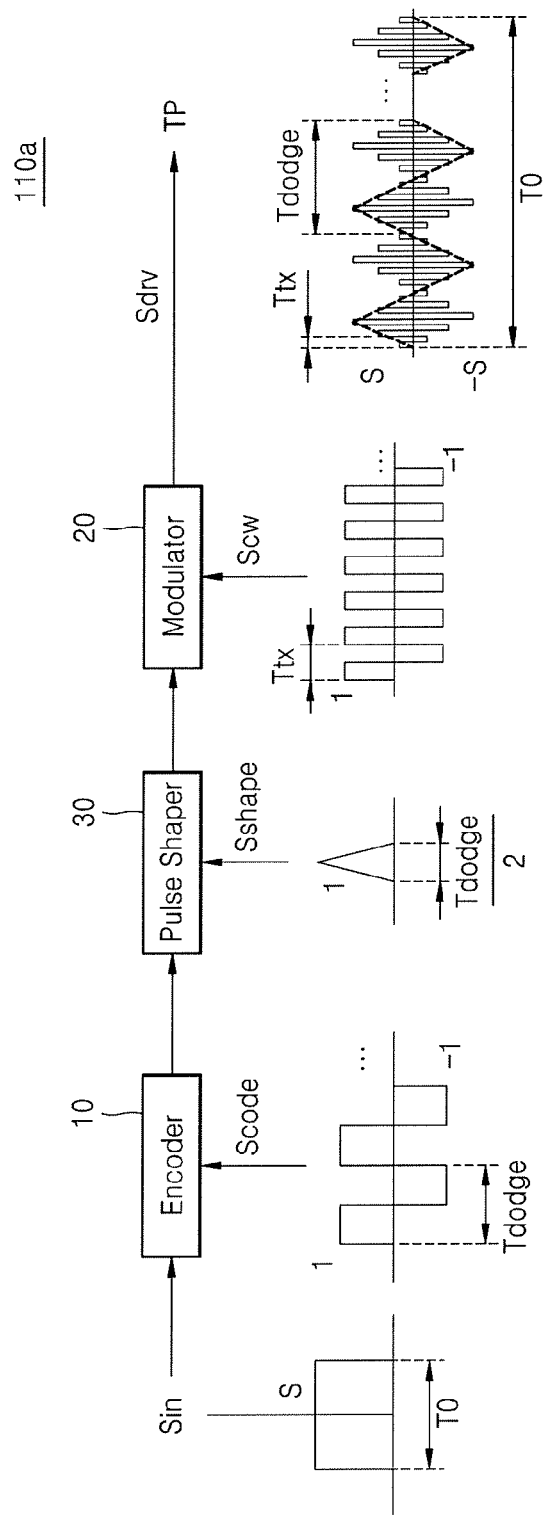
FIG. 8 is a block diagram illustrating a driving signal transmitter according to an exemplary embodiment of the inventive concept.

FIG. 8 is a block diagram illustrating a driving signal transmitter 110a according to an exemplary embodiment of the inventive concept. The driving signal transmitter 110 of FIG. 1 may be replaced with the driving signal transmitter 110a of FIG. 8.

Referring to FIG. 8, the driving signal transmitter 110a includes an encoder 10, a pulse shaper 30 (e.g., a pulse generator, a pulse shaping circuit, a filter), and a modulator 20.

Compared to the driving signal transmitter 110 of FIG. 6, the driving signal transmitter 110a according to the present exemplary embodiment furthers include the pulse shaper 30. The operations of the encoder 10 and the modulator 20 are described above with reference to FIG. 6, and thus a repeated description will be omitted.

The pulse shaper 30 changes a pulse shape of an input signal based on a shaping signal Sshape. For example, the pulse shaper 30 may change a pulse shape of a signal output from the encoder 10, that is, of an encoding signal.

For example, as illustrated in FIG. 8, the pulse shaper 30 changes an encoding signal to a triangular pulse shape based on a shaping signal Sshape indicating or having a triangular pulse shape and a time length Tdodge/2. For example, a length of a base of a triangular shaped signal within the shaping signal S shape has a time length Tdodge/2. A waveform of the encoding signal may be changed as illustrated by a dotted line in a driving signal Sdrv. Thus, as illustrated in FIG. 8, a triangular pulse signal that has a time length T0, transitions between voltage levels S and −S at a period Ttx, and has a phase that changes by 180 degrees at a period Tdodge may be generated as a driving signal Sdrv.

While the pulse shaper 30 that changes an encoding signal to a triangular pulse shape based on the shaping signal Sshape having a triangular pulse shape is described above according to the present exemplary embodiment, the inventive concept is not limited thereto. The pulse shaper 30 may change a shape of an encoding signal based on a shaping signal Sshape having various shapes such as a Gaussian pulse or a sine pulse.

Also, while the pulse shaper 30 is illustrated as being disposed after the encoder 10 to change a pulse shape of a signal output from the encoder 10, the inventive concept is not limited thereto. According to an exemplary embodiment, the pulse shaper 30 is disposed after the modulator 20 to change a pulse shape of a signal output from the modulator 20.

Figure 9:
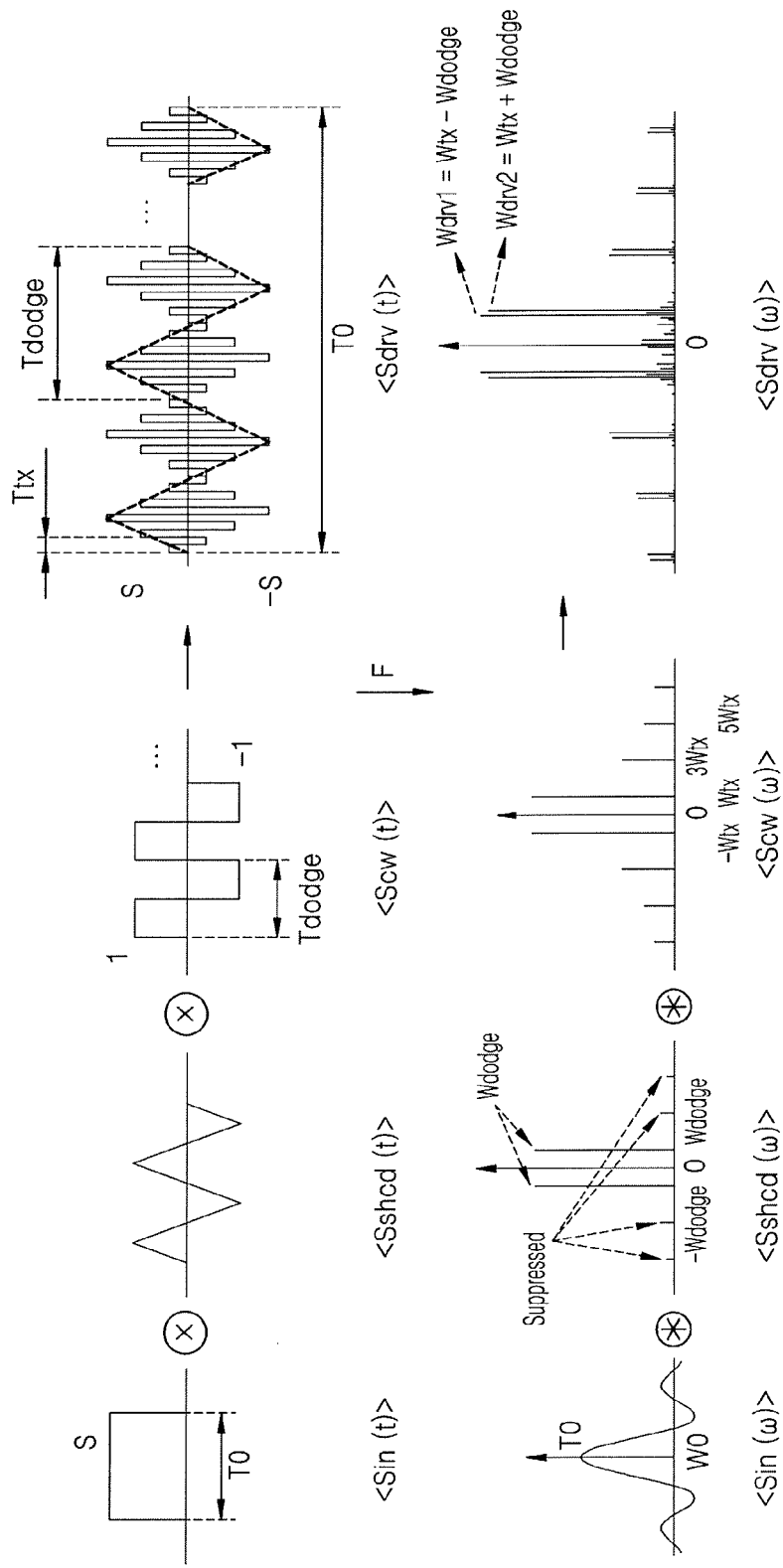
FIG. 9 is a graph showing a waveform of signals used in the driving signal transmitter of FIG. 8, in a time domain and a frequency domain.

FIG. 9 is a graph showing a waveform of signals used in the driving signal transmitter 110a of FIG. 8, in a time domain and a frequency domain.

Referring to FIG. 9, an input signal Sin(t), a shaped code signal Sshcd(t), and a carrier signal Scw(t) may be multiplied in a time domain to generate a driving signal Sdrv(t) as illustrated.

The shaped code signal Sshcd(t) is a signal obtained by multiplying the code signal Scode and the shaping signal Sshape in FIG. 8, and a harmonic component of the shaped code signal Sshcd(W) in a frequency domain is attenuated. As described above, the pulse shaper 30 of FIG. 8 may change a pulse shape of an applied signal to thereby attenuate a harmonic component of the applied signal in the frequency domain.

Referring to FIG. 9 again, the input signal Sin(t), the shaped code signal Sshcd(t), the carrier signal Scw(t), and the driving signal Sdrv(t) in a time domain may be expressed as a signal in a frequency domain. The input signal Sin(W) and the carrier signal Scw(t) are the same as expressed in Equations 1 and 3 described above. The shaped code signal Sshcd(w) may be expressed as in Equation 5, and the driving signal Sdrv(w) according to the shaped code signal Sshcd (w) may be expressed as in Equation 6.

$$Sshcd(W) = \sum_{k=-\infty}^{\infty} \frac{16}{\pi k^2} \delta(W - kWdodge) \qquad \text{[Equation 5]}$$

$$Sdrv(W) = \sum_{k=-\infty}^{\infty} \frac{4}{jk} Z(W - kWtx), \qquad \text{[Equation 6]}$$

$$Z(W) = Sin(W) * Sshcd(W)$$

Since a frequency of power of the input signal Sin(W) is spread by a dodging frequency Wdodge with respect to a carrier frequency Wtx, a driving signal Sdrv(w) having a first frequency Wdrv1 and a second frequency Wdrv2 may be generated. A power spectral density of the driving signal Sdrv(w) is relatively high at the first frequency Wdrv1 which is higher than a carrier frequency Wtx by the dodging frequency Wdodge and the second frequency Wdrv2 which is lower than the carrier frequency Wtx by the dodging frequency Wdodge, and a harmonic component of the dodging frequency Wdodge is relatively small.

Figure 10:
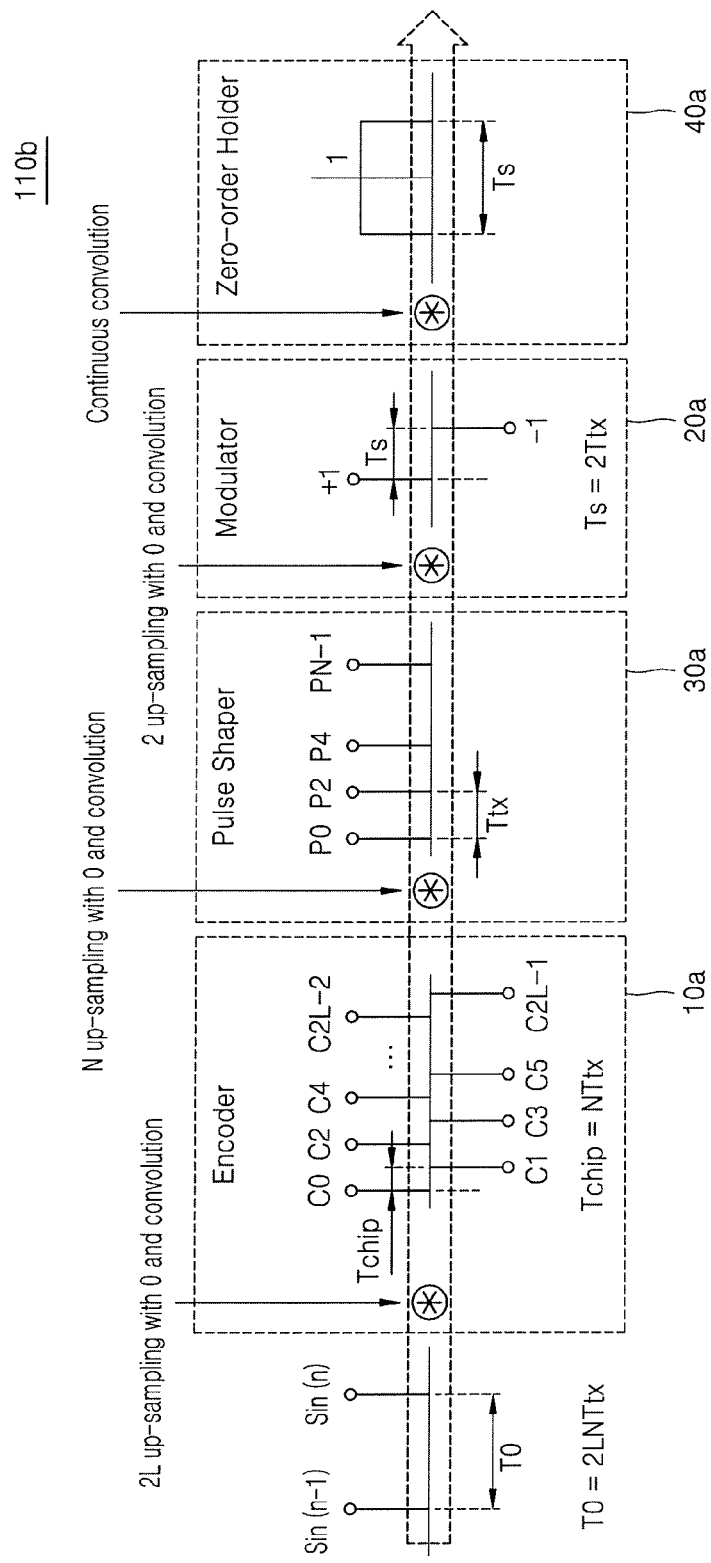
FIG. 10 illustrates a digital driving signal transmitter according to an exemplary embodiment of the inventive concept.

FIG. 10 illustrates a digital driving signal transmitter 110b according to an exemplary embodiment of the inventive concept. The driving signal transmitter 110 of FIG. 1 may be replaced with the digital driving signal transmitter 110b of FIG. 10.

Referring to FIG. 10, the digital driving signal transmitter 110b includes an encoder 10a, a pulse shaper 30a, a modulator 20a, and a zero order holder 40a.

The input signal Sin(n) is a digital signal that is sampled at a time period T0, and a value of the digital signal may be 1 or have a logic level 1, as an example. The time period T0 may be a time period that is 2*L*N times of a period Ttx of a carrier signal. 2 L is a value obtained by dividing the time period T0 by a period Tchip of one code value of a code signal used by the encoder 10a, and N is a value obtained by dividing the period Tchip by a carrier period Ttx. In other words, referring to FIGS. 6 through 8, 2 L indicates the numbers of a code value (for example 1 and −1) of a code signal Scode in a time length T0 of an input signal Sin, and N indicates the number of signals of a period Ttx of a carrier signal Scw included in a period Tchip of one code value of the code signal Scode.

Referring further to FIG. 10, the encoder 10a may encode an input signal Sin(n) by upsampling a sampling rate of the input signal Sin(n) by using 0 and convoluting the upsampled input signal by using a code signal. Here, respective coefficients C0, C1, C2, . . . C2L−1 of a code signal may be 1 or −1; a $0^{th}$ coefficient C0 and even-numbered coefficients C2, C4, . . . , C2L−2 may be 1, and odd-numbered coefficients C1, C3, . . . C2L−1 may be −1. In an embodiment, the upsampling produces an approximation of the input signal Sin(n) that would have been obtained by sampling the signal at a higher rate.

The pulse shaper 30a may upsample a sampling rate of an encoding signal N times by using 0 and convolute the upsampled encoding signal by using a shaping signal to thereby change a waveform of the encoding signal.

In regard to coefficients P0, P1, . . . , PN−1 of a shaping signal, if N is an even number, if k is equal to or smaller than N/2, a coefficient Pk is k, and if k is greater than N/2, Pk is N−k. Also, if N is an odd number, and k is equal to or smaller than (N+1)/2, Pk is k, and if k is greater than (N+1)/2, Pk may be (N+1)−k.

For example, when calculating a coefficient P2, if N is 6, and k is 2, and 2 is smaller than 6/2, that is, 3, and thus, the coefficient P2 is 2. When calculating a coefficient P5, k is 5, and 5 is greater than 3, and thus, the coefficient P5 is 1 which is obtained by subtracting 5 from 6.

Meanwhile, if all coefficients P0, P1, . . . , PN−1 are set to 1, a waveform of an encoding signal is not changed. This embodiment may correspond to the driving signal transmitter 110 of FIG. 6.

The modulator 20a may upsample a pulse-shaped signal received from the pulse shaper 30a by using 0. The modulator 20a may perform frequency modulation by upsampling twice a sampling rate of the pulse-shaped signal and convoluting the upsampled, pulse-shaped signal based on a carrier signal having a value of either 1 or −1 and having a time difference Ts between 1 and −1.

Next, the zero order holder 40a may convolute the frequency-modulated signal output from the modulator 20a by using a unit signal having a time length Ts to change the sampling signal, which is a discrete time signal, to a continuous time signal, thereby generating a driving signal Sdrv(t).

The detailed embodiment of the driving signal transmitter 110 (see FIG. 1) is described with reference to FIG. 10 above. However, FIG. 10 illustrates an exemplary embodiment of a driving signal transmitter for better understanding of the driving signal transmitter according to the inventive concept, and the inventive concept is not limited thereto. The driving signal transmitter may be embodied by circuits of various structures using a digital circuit or an analog circuit.

Figure 11:
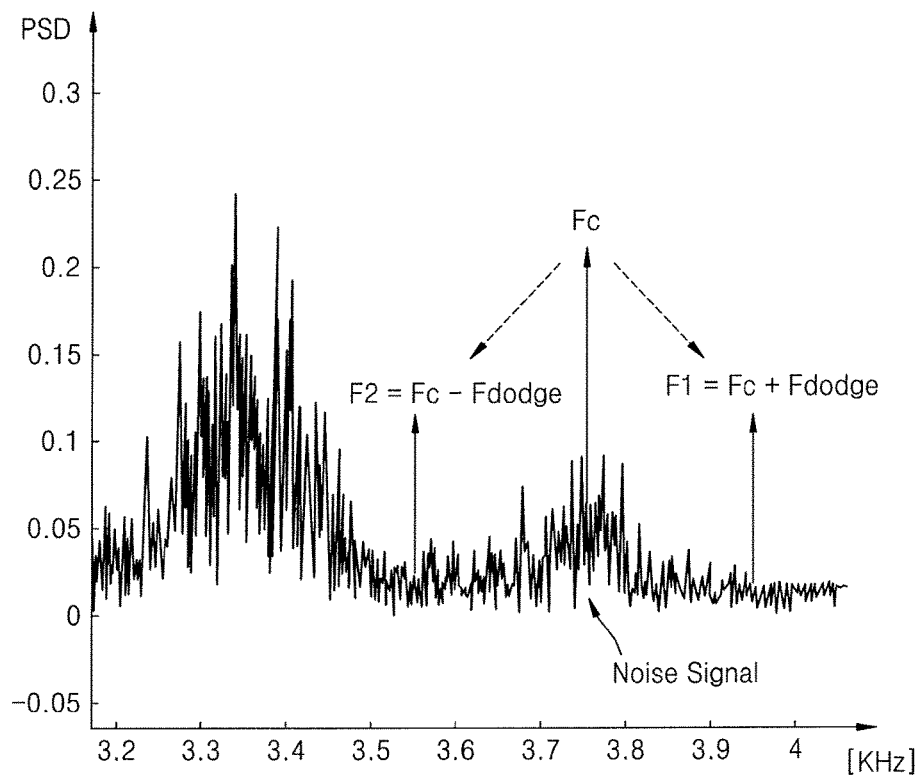
FIG. 11 is a diagram for explaining avoidance of in-band noise in a touch sensing system according to an exemplary embodiment of the inventive concept.

FIG. 11 is a diagram for explaining avoiding of in-band noise in a touch sensing system according to an exemplary embodiment of the inventive concept.

Referring to FIG. 11, a power spectral density of a noise signal is relatively high at about 3.5 KHz or less and low at a frequency greater than about 3.5 KHz. However, a power spectral density of in-band noise is 0.05 or higher at a carrier frequency Fc and portions around the carrier frequency Fc, which is higher than peripheral frequencies such as a first frequency F1 or a second frequency F2. Thus, according to the touch sensing device 1000 according to the present exemplary embodiment of the inventive concept, a frequency of a driving signal Sdrv may be spread to the first frequency F1 and the second frequency F2 which is either higher or lower than the carrier frequency Fc by a dodging frequency Fdodge to thereby avoid in-band noise.

Figure 12:
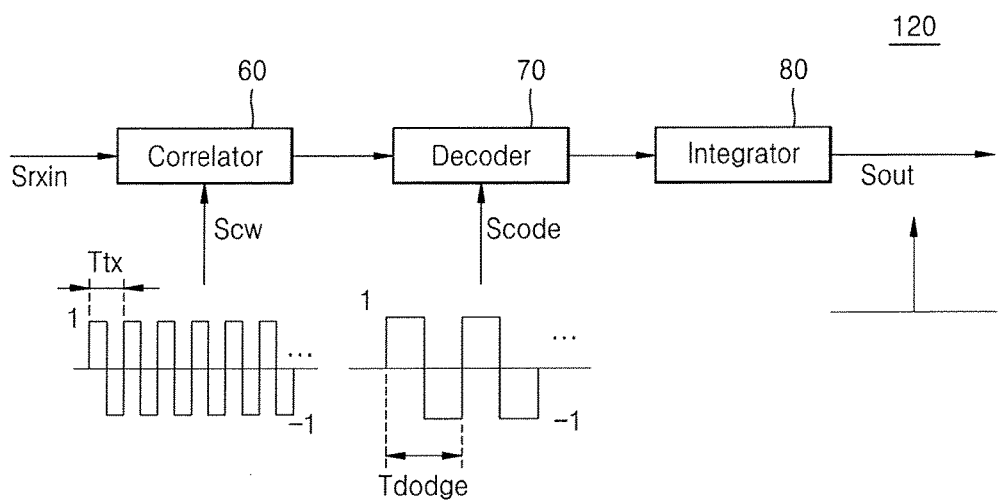
FIG. 12 is a block diagram illustrating a sensing signal receiver according to an exemplary embodiment of the inventive concept.

FIG. 12 is a block diagram illustrating a sensing signal receiver 120 according to an exemplary embodiment of the inventive concept.

Referring to FIG. 12, the sensing signal receiver 120 includes a correlator 60 (e.g., a correlator circuit), a decoder 70, and an integrator 80, and may demodulate or decode a reception signal Srxin to generate an output signal Sout indicating touch data. The reception signal Srxin may be a sensing signal Ssen output from the touch panel TP (see FIG. 1) or a signal obtained by a current-voltage conversion performed on the sensing signal Ssen. The reception signal Srxin may be in the form of the driving signal Sdrv of FIG. 6 or 8, or the driving signal Sdrv, to or from which a signal according to a touch input is added or subtracted.

The correlator 60 may remove noise, for example, noise input from the outside, from the reception signal Srxin and demodulate the reception signal Srxin. The correlator 60 may demodulate the reception signal Srxin based on a carrier signal Scw used in frequency modulation, for example, the carrier signal Scw used by the modulator 20 of FIGS. 6 and 8. According to an exemplary embodiment, the correlator 60 includes an analog-to-digital converter (ADC) that converts an analog touch signal to a digital touch signal quantized to M logic levels (where M is a natural number equal to or greater than 2). The correlator 60 may perform analog-to-digital conversion of a demodulated signal or demodulate a reception signal Srxin after performing analog-to-digital conversion on the same.

The decoder 70 may decode a demodulation signal output from the correlator 60 by using a code signal Scode. The code signal Scode is the same as the code signal Scode used by the encoder 10 of FIGS. 6 and 8.

The integrator 80 may generate an output signal Sout by integrating a decoding signal during a time T0. The output signal Sout may be touch data indicating variation in capacitance according to a touch input at a logic level M.

As illustrated in FIG. 12, the sensing signal receiver 120 may demodulate or modulate a reception signal Srxin by using the code signal Scode and the carrier signal Scw used by the driving signal transmitters 110 and 110a of FIGS. 6 and 8. A transfer function of the sensing signal receiver 120 may be similar or identical to transfer functions of the driving signal transmitters 110 and 110a. In other words, the sensing signal receiver 120 may have a matched filter structure. The sensing signal receiver 120 may generate touch data having a high signal to noise ratio (SNR).

Figure 13:
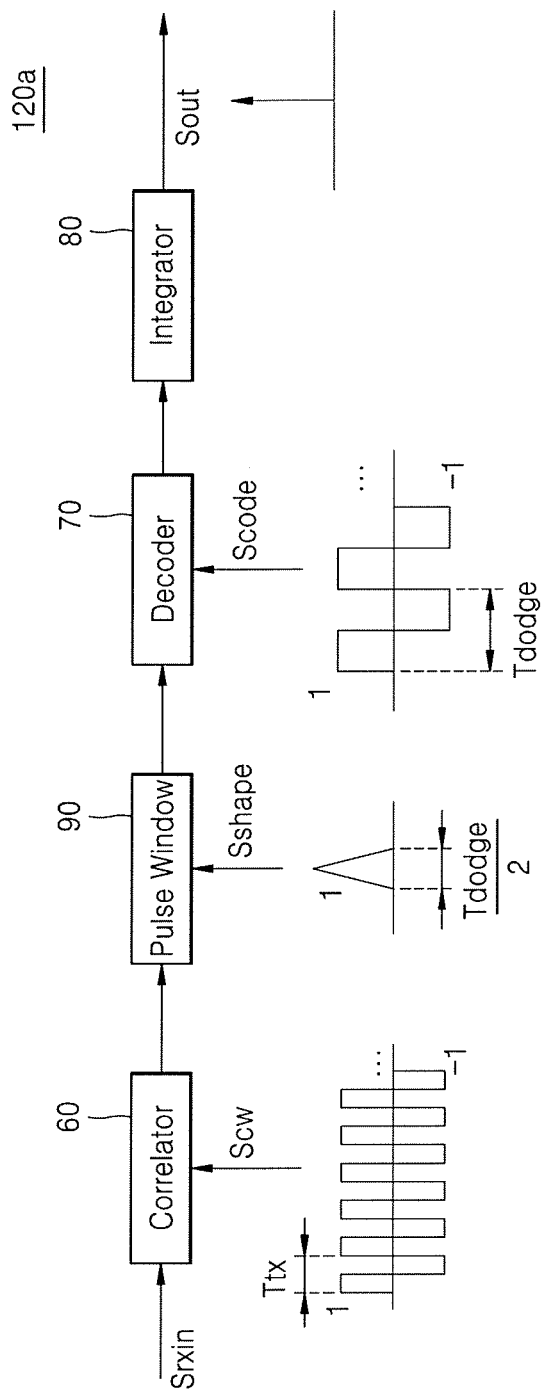
FIG. 13 is a block diagram illustrating a sensing signal receiver according to an exemplary embodiment of the inventive concept.

FIG. 13 is a block diagram illustrating a sensing signal receiver 120a according to an exemplary embodiment of the inventive concept. The sensing signal receiver 120 of FIG. 1 may be replaced with the sensing signal receiver 120a of FIG. 13.

Referring to FIG. 13, the sensing signal receiver 120a includes a correlator 60, a pulse window 90, a decoder 70, and an integrator 80.

Compared to the sensing signal receiver 120 of FIG. 12, the sensing signal receiver 120a of FIG. 13 further includes the pulse window 90 (e.g., a pulse window circuit). The operations of the correlator 60, the decoder 70, and the integrator 80 are described above with reference to FIG. 12, and thus, repeated description will be omitted.

Referring to FIG. 13, the pulse window 90 (e.g., a pulse generator, a filter, etc.) changes a waveform of a demodulation signal output from the correlator 60 by using a shaping signal Sshape. For example, the shaping signal Sshape may be a signal in a form in which a harmonic component is attenuated, such as a triangular pulse, a Gaussian pulse, a sine pulse or the like. According to an exemplary embodiment, the shaping signal Sshape is a signal of the same shape as the shaping signal Sshape used by the driving signal transmitter 110a of FIG. 8.

Figure 14:
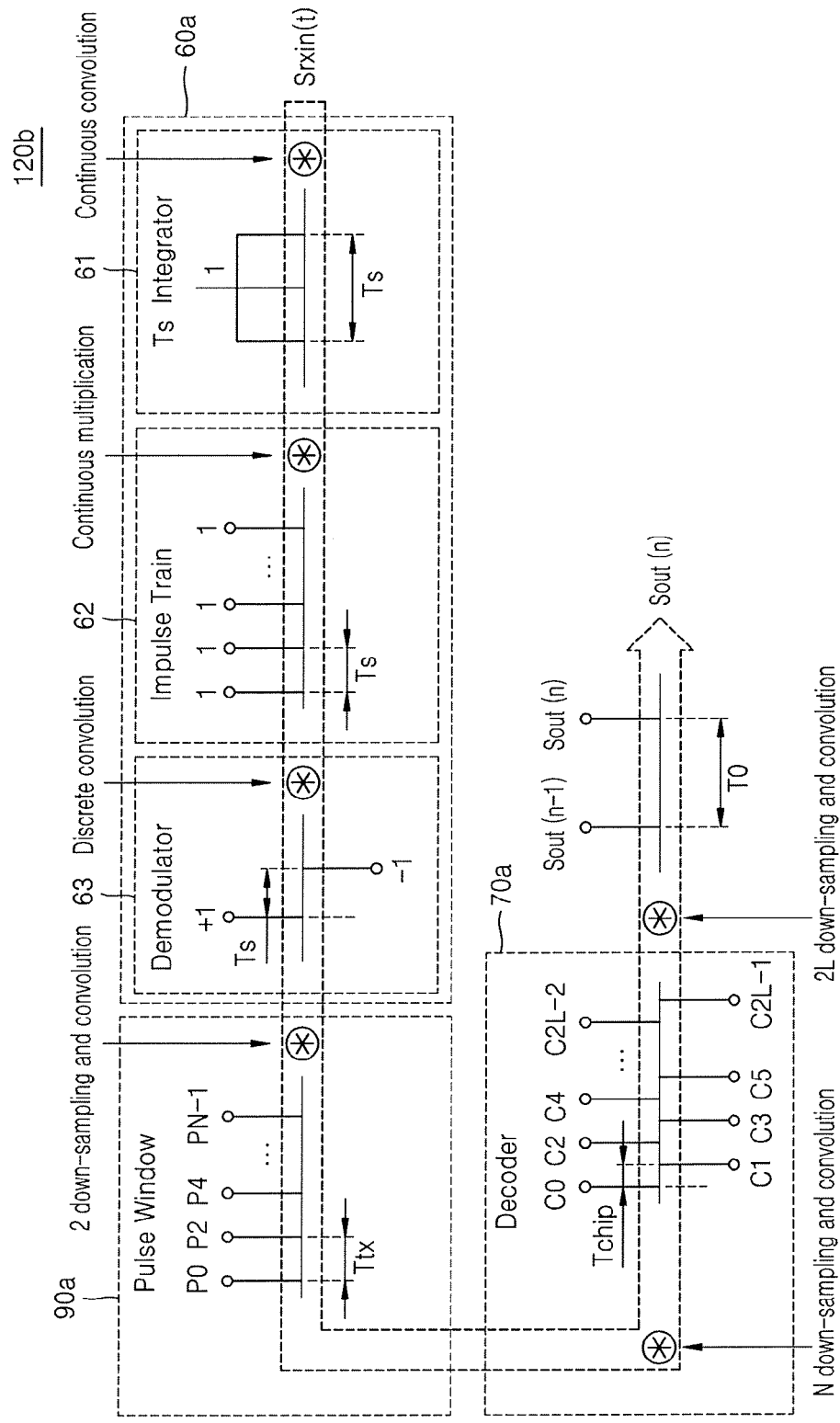
FIG. 14 illustrates a digital sensing signal receiver according to an exemplary embodiment of the inventive concept.

FIG. 14 illustrates a sensing signal receiver 120b according to an exemplary embodiment of the inventive concept, implemented in a digital manner. The sensing signal receiver 120 of FIG. 1 may be replaced with the sensing signal receiver 120b of FIG. 14.

Referring to FIG. 14, the sensing signal receiver 120b includes a correlator 60a, a pulse window 90a, and a decoder 70.

A reception signal Srxin may be a sensing signal Ssen output from the touch panel TP (see FIG. 1) or a signal obtained by performing a current-voltage conversion on the sensing signal Ssen. The reception signal Srxin may be in the form of the driving signal Sdrv of FIG. 6 or 8, or the driving signal Sdrv to or from which a signal according to a touch input is added or subtracted.

The correlator 60a includes a Ts integrator 61, an impulse train 62, and a demodulator 63, and may remove a carrier frequency component from the reception signal Srxin(t) and generate a touch signal of logic level M.

The Tx integrator 61 may convolute the reception signal Srxin(t) by using a unit signal having a time length Ts to generate an integration signal.

The impulse train 62 may convert the integration signal output from the Ts integrator 61 to a quantized signal of logic level M. The impulse train 62 may generate a quantized signal of logic level M by multiplying the integration signal by impulse signals arranged at a period Ts. The impulse train 62 may be a type of an ADC. According to an exemplary embodiment, the impulse train 62 may be formed of a comparator of a level M and a switch that is switched at a period Ts.

The demodulator 63 may convolute the signal of logic level M output from the impulse train 62 by using a carrier signal having a value of either 1 or −1 and having a time length Ts between 1 and −1, to thereby remove a carrier frequency component from the signal of logic level M and generate a touch signal of logic level M.

The pulse window 90a may downsample a sampling rate of the touch signal output from the correlator 60a twice and convolute the downsampled signal by using a shaping signal to thereby shape the touch signal.

In regard to a coefficient Pk, if N is an even number, and k is equal to or smaller than N/2, the coefficient Pk is k, and if k is greater than N/2, Pk is N−k. Also, if N is an odd number, and k is equal to or smaller than (N+1)/2, the coefficient Pk is k, and if k is greater than (N+1)/2, the coefficient Pk may be (N+1)−k.

Meanwhile, all coefficients P0, P1, . . . , PN−1 of the pulse window 90a may be set to 1, and in this case, the sensing signal receiver 120b may correspond to the sensing signal receiver 120 illustrated in FIG. 12 that does not include a pulse window.

The decoder 70a may decode the shaped touch signal received from the pulse window 90a by using a code signal, thereby generating touch data.

The decoder 70a may downsample a sampling rate of the shaped touch signal received from the pulse window 90a N times and decode the downsampled signal by using a code signal. The code signal may be the same as the code signal used in encoding by the encoder 10a of FIG. 10. A first coefficient C0 and even-numbered coefficients C2, C4, . . . , C2L−2 may be 1, and odd-numbered coefficients C1, C3, . . . C2L−1 may be −1. The decoder 70a may output an output signal Sout(n) for each period T0.

The detailed embodiment of the sensing signal receiver 120 (see FIG. 1) is described with reference to FIG. 14 above. However, FIG. 14 illustrates an exemplary embodiment of a sensing signal receiver for better understanding of the sensing signal receiver according to the inventive concept, and the inventive concept is not limited thereto. The sensing signal receiver may be implemented by circuits of various structures using a digital circuit or an analog circuit.

Figure 15:
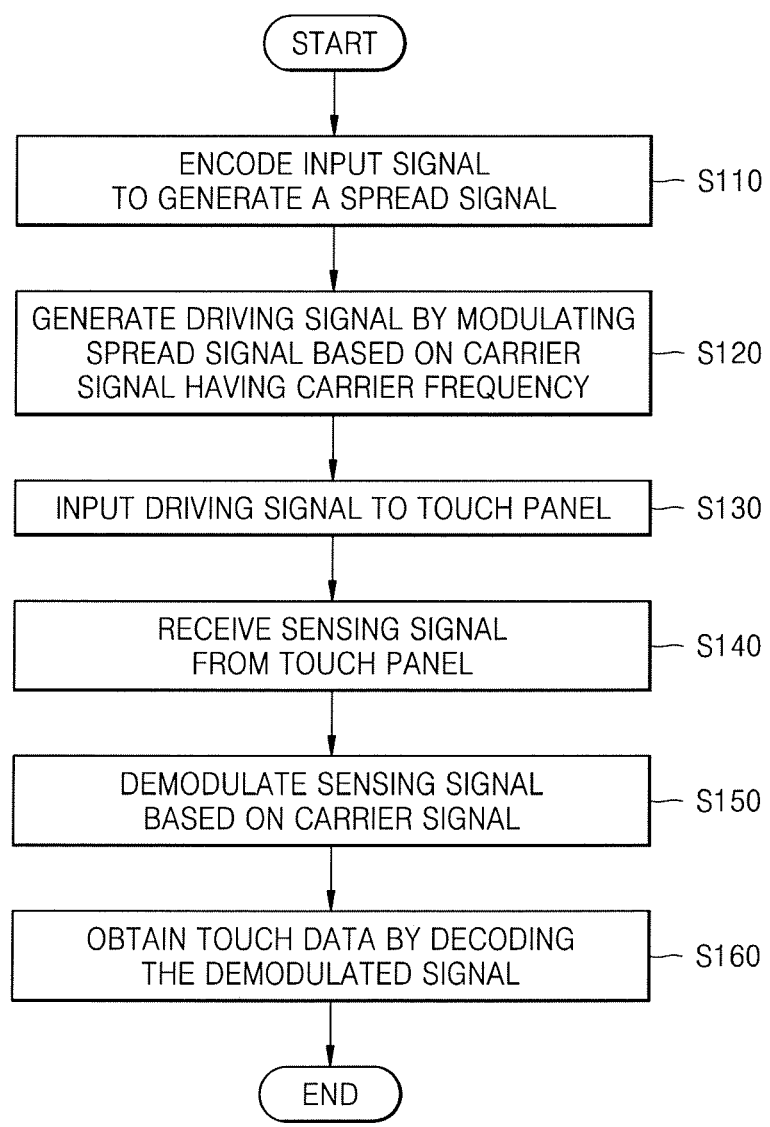
FIG. 15 is a flowchart of a touch sensing method according to an exemplary embodiment of the inventive concept.

FIG. 15 is a flowchart of a touch sensing method according to an exemplary embodiment of the inventive concept.

The touch sensing method of FIG. 15 is a method of generating a driving signal and touch data, performed by a touch sensing device, and description with reference to FIGS. 1 through 14 may also be applied to the touch sensing method according to the present exemplary embodiment.

Referring to FIG. 15, in operation S110, the driving signal transmitter 110 (see FIG. 1) encode an input signal to generate a spread signal. A frequency of the input signal is spread to a dodging frequency by encoding the input signal. The dodging frequency may be a preset frequency to avoid in-band noise. An input signal may be a base band signal, and a frequency of the input signal may be set based on a frame frequency and a resolution of the touch panel TP (see FIG. 1). The driving signal transmitter 110 may spread a frequency of an input signal by encoding the input signal based on a code signal having a dodging frequency. A signal that is encoded so that a frequency thereof is spread may be referred to as an encoding signal.

In operation S120, the driving signal transmitter 110 modulates a frequency of the spread signal, which is frequency-spread in operation S110, based on a carrier signal having a carrier frequency, to generate the modulated signal as a driving signal. A carrier frequency may be a high frequency signal that is appropriate to be transmitted, and may be a signal of about several MHz to several tens of MHz. A carrier frequency may be preset by considering physical characteristics and external operation environments of the touch panel TP.

According to operations S110 and S120, a frequency of an input signal may be spread to a first frequency which is higher than a carrier frequency by a dodging frequency and a second frequency which is lower than the carrier frequency by the dodging frequency.

According to an exemplary embodiment, the method further includes, after operation S110 or S120, shaping a pulse waveform of the spread signal or a modulation signal. For example, a pulse waveform of the spread signal or a modulation signal may be changed to a pulse shape of a shaping signal such as a triangular pulse, a Gaussian pulse, or a sine pulse, thereby attenuating a harmonic component of the spread signal or the modulation signal.

In operation S130, the driving signal transmitter 110 applies the driving signal to the touch panel TP. A touch input on the touch panel TP may be sensed based on the driving signal.

In operation S140, the sensing signal receiver 120 (see FIG. 1) receives a sensing signal from the touch panel TP. The sensing signal may be a current signal or a voltage signal. Later, touch data may be generated based on the sensing signal.

In operation S150, the sensing signal is demodulated based on a carrier signal. The sensing signal receiver 120 may remove a carrier frequency component from the sensing signal by demodulating the sensing signal by using the carrier signal having the carrier frequency used in operation S120.

In operation S160, touch data is obtained by decoding the demodulated signal based on the code signal. The sensing signal receiver 120 may decode the demodulated signal by using the code signal used in operation S110 to generate touch data. A frequency of the demodulated signal is despread to the frequency of the input signal, that is, a baseband signal by decoding the demodulated signal.

According to an exemplary embodiment, after operation S150, the method may further include shaping a waveform of the demodulated signal. For example, a waveform of the demodulated signal may be shaped by using a shaping signal such as a triangular pulse, a Gaussian pulse, or a sine pulse. In an embodiment, this shaping is performed using a Sinc filter, a Raised-cosine filter, or a Gaussian filter. According to an exemplary embodiment, the shaping signal has the same as the shaping signal used in the shaping of the pulse waveform. Alternatively, the shaping signal has a similar pulse shape as the shaping signal used in the shaping of the pulse waveform.

As described above, the sensing signal receiver 120 generates touch data by using a transfer function that is identical or similar to a transfer function of signals used by the driving signal transmitter 110 in operations S150 and S160, thereby generating touch data having a high signal to noise ratio (SNR) against additive white Gaussian noise (AWGN).

Figure 16A:
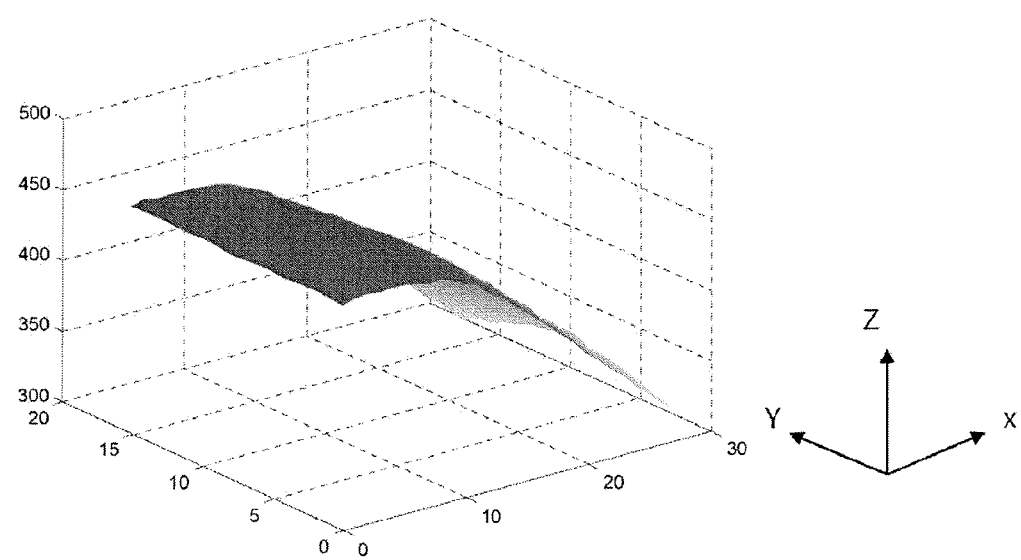
FIGS. 16A and 16B are graphs showing a gain deviation and a gain reduction rate according to positions on a touch panel.
Figure 16B:
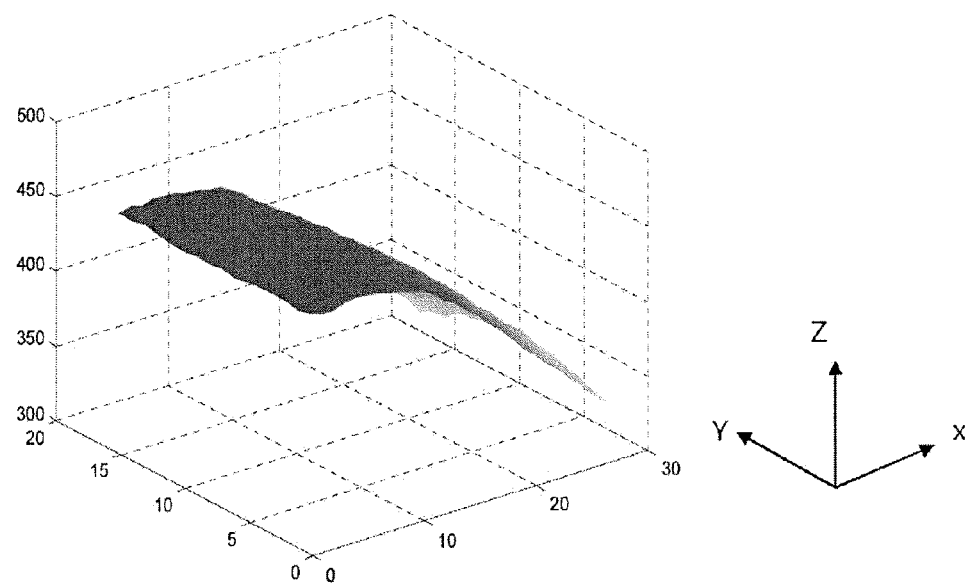

FIGS. 16A and 16B are graphs showing a gain deviation and a gain reduction rate according to positions on a touch panel. FIGS. 16A and 16B are diagrams for explaining the effect of a method of driving a touch panel according to at least one exemplary embodiment of the inventive concept, and show gain deviation and a gain reduction rate according to positions on a touch panel under a predetermined condition, for example, a touch panel having predetermined panel characteristics.

FIG. 16A shows gain deviation and a gain reduction rate of a touch panel according to positions on a touch panel according to a driving signal generated by modulating a frequency of an input signal, and FIG. 16B shows gain deviation and a gain reduction rate of a touch panel according to positions on a touch panel according to a driving signal generated by spreading and modulating a frequency of an input signal according to an exemplary embodiment of the inventive concept.

Referring to FIGS. 16A and 16B, a two-dimensional plane of an X axis and a Y axis denotes a two-dimensional plane of the touch panel TP (see FIG. 1), and the Y axis denotes gain according to respective positions on the touch panel TP. A driving signal may be sequentially applied to multiple points on the Y axis where an X coordinate is 0. A driving signal is applied at points corresponding to X coordinates from 0 to 30, and a voltage of the driving signal may be decreased away from a point where the driving signal is applied, due to, for example, an IR drop or parasitic capacitance. A sensing signal may be output from points on the X axis where a Y coordinate is 0, and a voltage of the sensing signal may be decreased away from the point where the sensing signal is output. Accordingly, gain deviation according to positions on the touch panel may be generated, and a gain reduction rate may be increased at points away from a point where the driving signal is applied or the point from which the sensing signal is output.

Referring to FIG. 16A, a gain average of the touch panel according to a driving signal that is obtained by modulating an input signal to a carrier frequency of 375 kHz is 413, and a minimum and a maximum of the gain may be respectively 313 and 457, and a gain deviation may be 1.5.

Referring to FIG. 16B, a gain average of a touch panel according to a driving signal obtained by spreading an input signal to a dodging frequency of 62.5 KHz and modulating the input signal to a carrier frequency of 375 KHz, that is, according to a driving signal whose power is spread to 312.5 KHz and 437.5 KHz, may be 417.2, and a minimum and a maximum of the gain are respectively 327 and 456, and gain deviation may be 1.39. A gain is increased (or reduced) from a second frequency, for example, 312.5 KHz, by an amount of gain that is reduced (or increased) from a first frequency, for example, 437.5 KHz, so that a variation in gain and gain deviation of the touch panel may not be great.

If a carrier frequency of a driving signal is changed in order to avoid in-band noise, gain of the touch panel and gain deviation thereof may increase. However, when sensing a touch panel by using a frequency-spread driving signal without changing a carrier frequency, gain of the touch panel and gain deviation thereof are not increased. In other words, transfer characteristics of a passband signal may be maintained.

Figure 17:
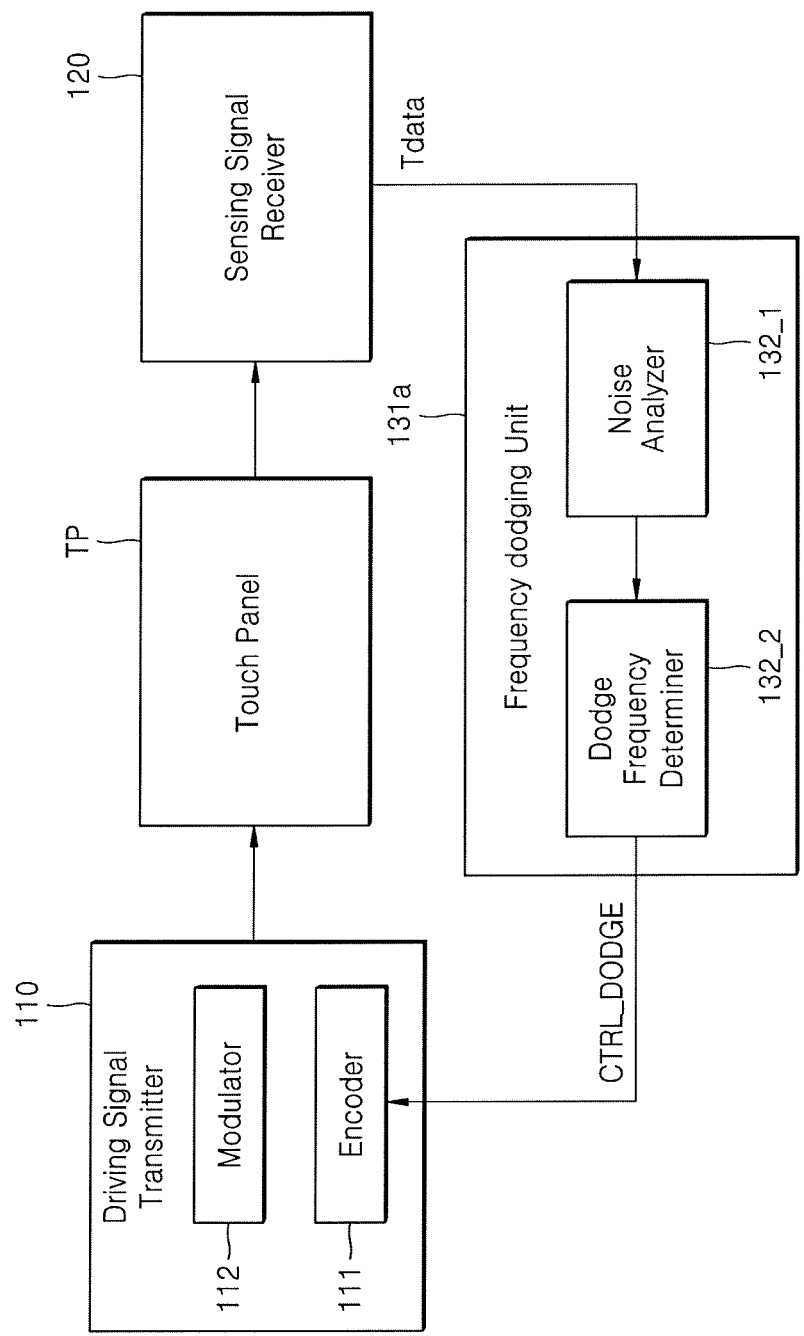
FIG. 17 is a block diagram illustrating a frequency dodging unit according to an exemplary embodiment of the inventive concept.

FIG. 17 is a block diagram illustrating a frequency dodging unit 131a according to an exemplary embodiment of the inventive concept. The frequency dodging unit 131 of FIG. 1 may be replaced with the frequency dodging unit 131 of FIG. 17. For convenience of description, the driving signal transmitter 110, the touch panel TP, and the sensing signal receiver 120 are illustrated together.

Referring to FIG. 17, the driving signal transmitter 110 applies a driving signal to the touch panel TP that is frequency-modulated based on a preset carrier frequency. The sensing signal receiver 120 may receive a sensing signal from the touch panel TP, and may generate touch data Tdata based on the sensing signal.

The frequency dodging unit 131a determines a dodging frequency based on the touch data Tdata, and provides information about the dodging frequency to the encoder 111 included in the driving signal transmitter 110 as a control signal CTRL_DODGE. The encoder 111 may adjust the dodging frequency, that is, a frequency of a code signal, based on the control signal CTLR_DODGE.

The frequency dodging unit 131a may determine a dodging frequency at an initial stage of an operation of the touch sensing device 1000 (see FIG. 1) or the touch sensing device 1000 may change a dodging frequency based on feedback touch data Tdata during operation of the touch sensing device 1000.

According to an exemplary embodiment, the frequency dodging unit 131a determines a dodging frequency based on an operation control signal applied from the outside. For example, the frequency dodging unit 131a may determine a dodging frequency in response to a signal notifying of a start of an operation of the touch sensing device 1000 or a signal indicating initialization of the touch sensing device 1000. In an embodiment, the frequency dodging unit 131 determines the dodging frequency when the touch panel or the touch controller is first powered on. Alternatively, the frequency dodging unit 131*a* may operate in response to a signal notifying a change in an operating environment of the touch sensing device 1000. According to an exemplary embodiment, the frequency dodging unit 131 periodically operates at a preset predetermined time period to adjust the dodging frequency. In an exemplary embodiment, the frequency dodging unit 131 adjusts the dodging frequency whenever an error occurs in calculated touch coordinates.

The frequency dodging unit 131*a* may include a noise analyzing unit 132_1 and a dodging frequency determining unit 132_2.

In an embodiment, the noise analyzing unit 132_1 analyzes a frequency component of noise generated in the touch panel TP based on the touch data Tdata. According to an exemplary embodiment, the noise analyzing unit 132_1 analyzes a spectrum of the noise.

The dodging frequency determining unit 132_2 may determine a dodging frequency based on the analyzed frequency component of the noise. According to an exemplary embodiment, the dodging frequency determining unit 132_2 determines a dodging frequency such that power of a driving signal is spread to a frequency with noise having a lowest power spectral density. According to an exemplary embodiment, the dodging frequency determining unit 132_2 determines a dodging frequency by determining whether noise is equal to or greater than a reference value. For example, if noise is equal to or greater than a reference value, the dodging frequency determining unit 132_2 changes a dodging frequency of the driving signal, and if noise is less than the reference value, the dodging frequency determining unit 132_2 generates a control signal CTRL_DODGE to maintain a present dodging frequency.

Figure 18:
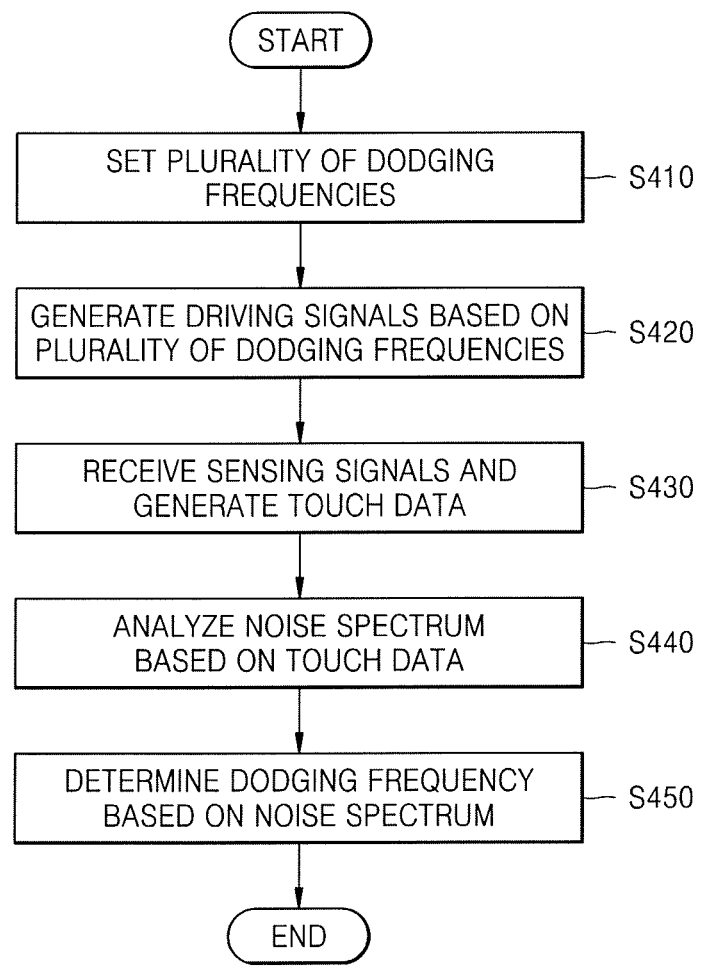
FIG. 18 is a flowchart of a method of determining a dodging frequency according to an exemplary embodiment of the inventive concept.

FIG. 18 is a flowchart of a method of determining a dodging frequency according to an exemplary embodiment of the inventive concept. The method of determining a dodging frequency of FIG. 18 may be applied to the frequency dodging unit 131*a* of FIG. 17, and thus the method will be described with reference to FIGS. 17 and 18.

Referring to FIG. 18, in operation S410, a plurality of dodging frequencies are set. For example, a user may calculate an expected candidate noise group by considering the physical characteristics of the touch panel TP and a carrier frequency and may preset a plurality of dodging frequencies that allow avoidance of the candidate noise group. The plurality of dodging frequencies may be stored in the frequency dodging unit 131*a*.

In operation S420, the driving signal transmitter 110 generates a plurality of driving signals based on the plurality of dodging frequencies. In other words, the driving signal transmitter 110 may generate a plurality of driving signals having different spread frequencies. The driving signal transmitter 110 may apply the plurality of driving signals to the touch panel TP.

In operation S430, the sensing signal receiver 120 receives sensing signals sensed based on the plurality of driving signals, and generates touch data based on the respective sensing signals. The sensing signal receiver 120 may generate touch data respectively corresponding to the plurality of driving signals. According to an exemplary embodiment, operations S420 and S440 are simultaneously performed on a plurality of dodging frequencies. According to an exemplary embodiment, operations S420 and S430 are sequentially performed on a plurality of dodging frequencies.

In operation S440, the noise analyzing unit 132_1 analyzes a spectrum of noise based on the touch data. The touch data is generated to respectively correspond to a plurality of dodging frequencies. Thus, a noise spectrum analyzed based on the touch data may correspond to the plurality of dodging frequencies.

In operation S450, the dodging frequency determining unit 132_2 determines a dodging frequency based on the noise spectrum. For example, the dodging frequency determining unit 132_2 may select a dodging frequency corresponding to one of the plurality of dodging frequencies having the least noise component.

Figure 19:
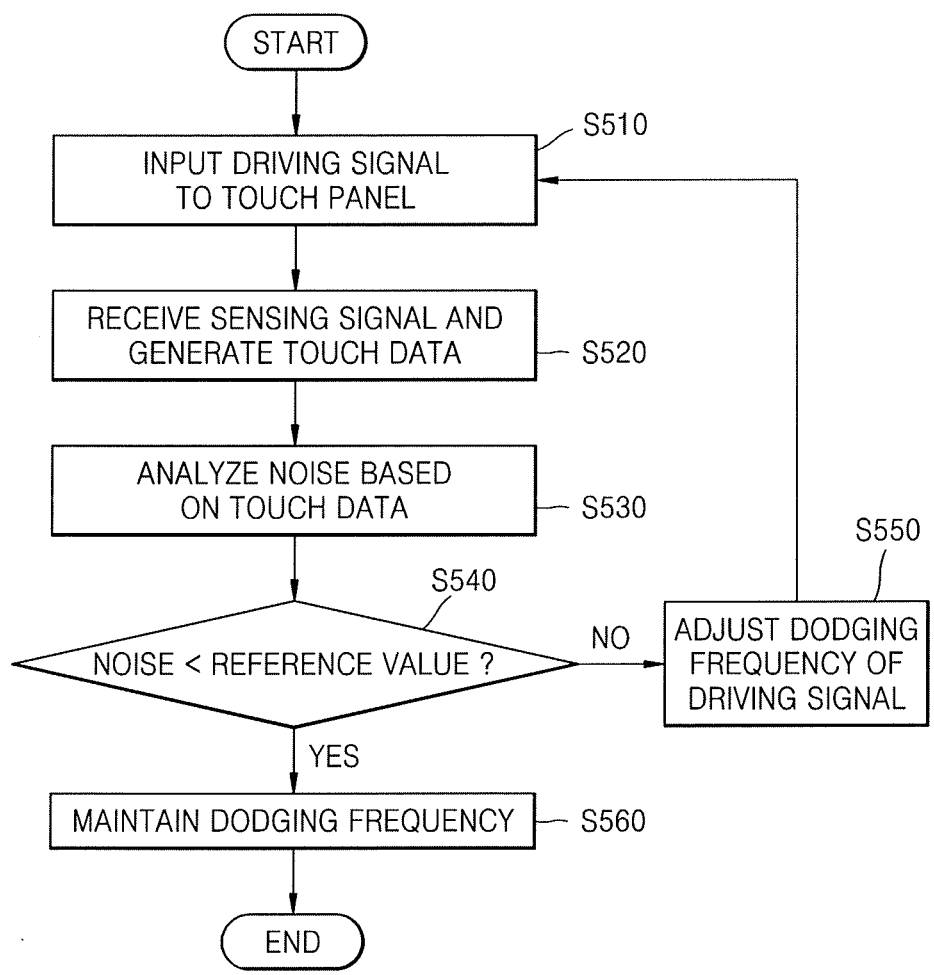
FIG. 19 is a flowchart of a method of determining a dodging frequency according to an exemplary embodiment of the inventive concept.

FIG. 19 is a flowchart of a method of determining a dodging frequency according to an exemplary embodiment of the inventive concept. The method of determining a dodging frequency of FIG. 19 may be applied to the frequency dodging unit 131*a* of FIG. 17, and thus the method will be described with reference to FIGS. 17 and 19.

Referring to FIG. 19, in operation S510, the driving signal transmitter 110 applies a driving signal to the touch panel TP. The driving signal is generated based on a preset dodging frequency.

In operation S520, the sensing signal receiver 120 receives a sensing signal and generates touch data corresponding to the driving signal.

In operation S530, the noise analyzing unit 132_1 analyzes noise based on the touch data. The noise analyzing unit 132_1 may analyze an amount of noise corresponding to the driving signal.

In operation S540, the dodging frequency determining unit 132_2 determines whether the noise is equal to or greater than a reference value. The reference value may be preset to prevent an error according to noise when touch coordinates are generated, and may represent a maximum amount of allowable noise.

If noise is equal to or greater than a reference value, in operation S550, the dodging frequency determining unit 132_2 adjusts a dodging frequency of the driving signal. According to an exemplary embodiment, the dodging frequency determining unit 132_2 selects one of a plurality of preset frequencies. According to an exemplary embodiment, the dodging frequency determining unit 132_2 adjusts (e.g., increments/decrements) a dodging frequency by a preset predetermined movement frequency. For example, if a present dodging frequency is 62 KHz and a set movement frequency is 10 KHz, the dodging frequency determining unit 132_2 may move the dodging frequency by 10 KHz. For example, the dodging frequency determining unit 132_2 may set a dodging frequency to 72 KHz or 52 KHz.

If noise is less than the reference value, the dodging frequency determining unit 132_2 determines the present dodging frequency as a dodging frequency of the touch sensing device in operation S560. In other words, the dodging frequency determining unit 132_2 maintains the present dodging frequency when the noise is less than the reference value.

Figure 20:
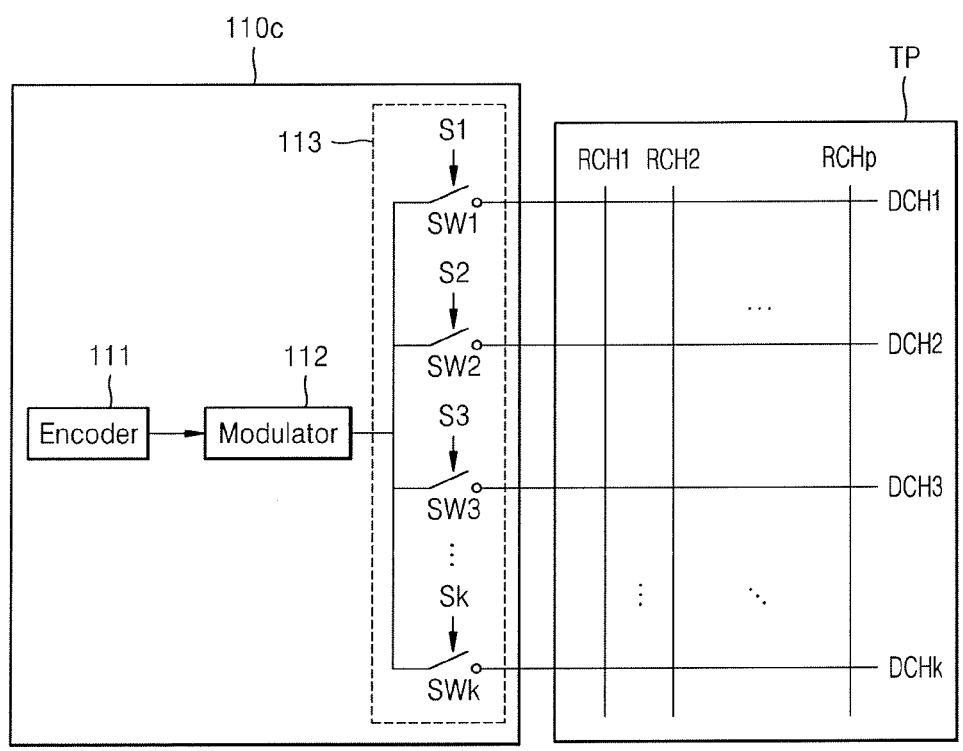
FIG. 20 is a block diagram illustrating a driving signal transmitter according to an exemplary embodiment of the inventive concept.

FIG. 20 is a block diagram illustrating a driving signal transmitter 110*c* according to an exemplary embodiment of the inventive concept. The driving signal transmitter 110 of FIG. 1 may be replaced by the driving signal transmitter 110*c* of FIG. 20.

Referring to FIG. 20, the driving signal transmitter 110*c* includes an encoder 111, a modulator 112, and a switching unit 113. The driving signal transmitter 110*c* may further include a pulse shaper.

The encoder 111 and the modulator 112 respectively encode an input signal and modulate a frequency of the input signal to generate a driving signal. The encoder 111 and the modulator 112 are described above with reference to FIG. 1, and thus descriptions thereof will be omitted.

The switching unit 113 may sequentially transmit a driving signal to a plurality of driving channels DCH1 through DCHk included in the touch panel TP. The switching unit 113 may include a plurality of switches SW1 through SWk respectively connected to the plurality of driving channels DCH1 through DCHk included in the touch panel TP. The plurality of switches SW1 through SWk are turned on in response to corresponding switching signals Si through SWk, and may transmit a driving signal to the corresponding driving channels DCH1 through DCHk. According to an exemplary embodiment, the plurality of switches SW1 through SWk are respectively turned on at different times. For example, when the switches SW1 through SWk are turned on at different times, the turn-on times are not the same. According to an exemplary embodiment, the plurality of switches SW1 through SWk are respectively turned on at different time points and some of the turn-on times are the same. According to an exemplary embodiment, some of the switches SW1 through SWk are simultaneously turned on.

Figure 21:
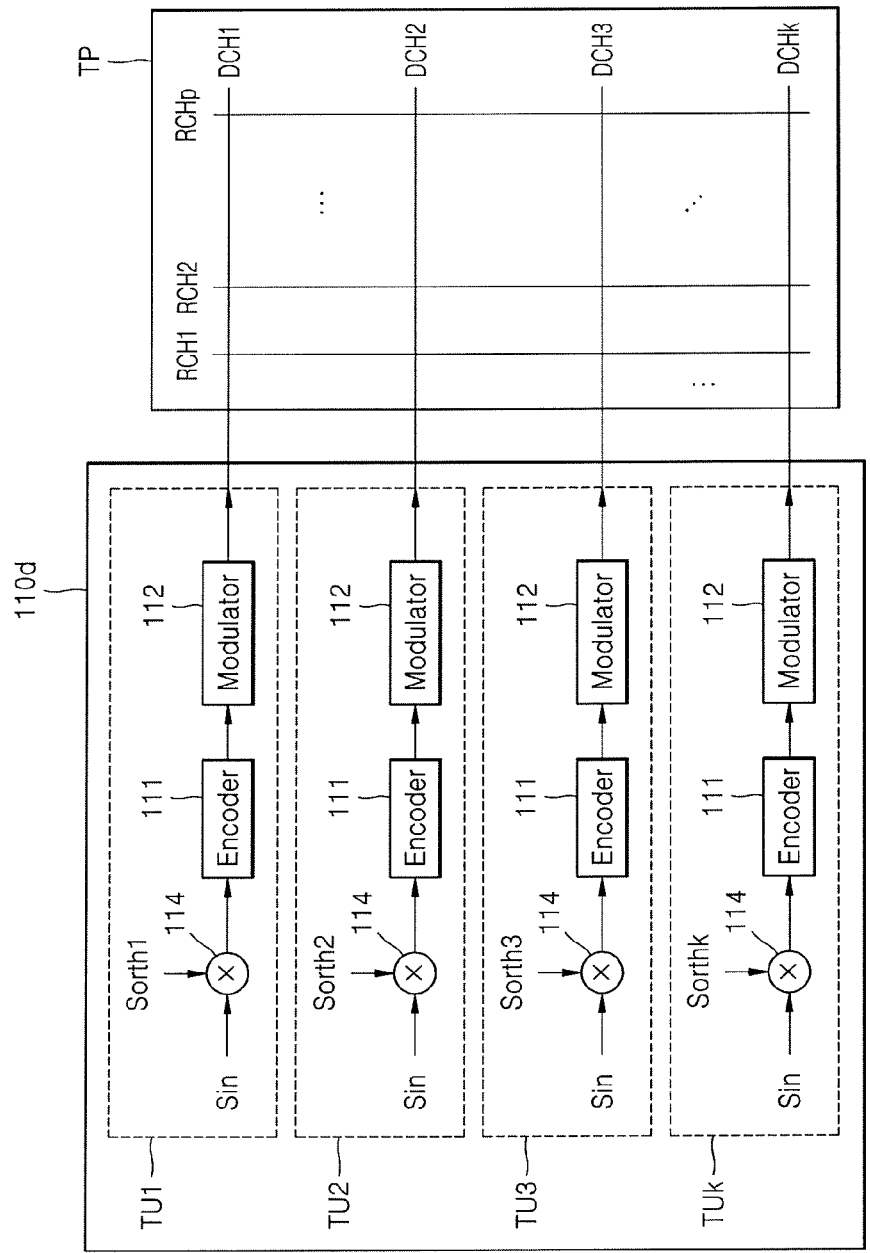
FIG. 21 is a block diagram illustrating a driving signal transmitter according to an exemplary embodiment of the inventive concept, where a touch panel TP is also illustrated for convenience of description.

FIG. 21 is a block diagram illustrating a driving signal transmitter 110d according to an exemplary embodiment of the inventive concept, where the touch panel TP is also illustrated for convenience of description. The driving signal transmitter 110 of FIG. 1 may be replaced by the driving signal transmitter 110d of FIG. 20.

Referring to FIG. 21, the driving signal transmitter 110d includes a plurality of transmission units TU1 through TUk (e.g., transmitters). The plurality of transmission units TU1 through TUk may each include a signal synthesizer 114, an encoder 111, and a modulator 112 and generate a driving signal to provide the same to corresponding driving channels DCH1 through DCHk.

The plurality of transmission units TU1 through TUk may generate a plurality of driving signals based on different orthogonal code signals Sorth1 through Sorthk from one another. The plurality of driving signals generated in the plurality of transmission units TU1 through TUk may include different orthogonal codes from one another.

The plurality of transmission units TU1 through TUk may simultaneously transmit all or some of the plurality of driving signals DCH1 through DCHk to corresponding driving channels DCH1 through DCHk. A sensing signal receiver (the sensing signal receiver 120 of FIG. 1) may separate touch data corresponding to respective driving signals from one sensing signal by using the orthogonal code signals Sorth1 through Sorthk. By using a multi-driving method as described above, a frame frequency of the touch panel TP may be increased. Alternatively, even when a resolution of the touch panel TP is increased, a touch input may be sensed without reducing a frame frequency.

According to an exemplary embodiment, dodging frequencies of all of or some of the encoders 111 included in the plurality of transmission units TU1 through TUk are set differently from one another. For example, a dodging frequency of the encoder 111 included in a first transmission unit TU1 and a dodging frequency of the encoder 111 included in a kth transmission unit TUk may be different from each other. Thus, dodging frequencies of driving signals to be applied may be differently set according to positions on the touch panel TP.

Figure 22:
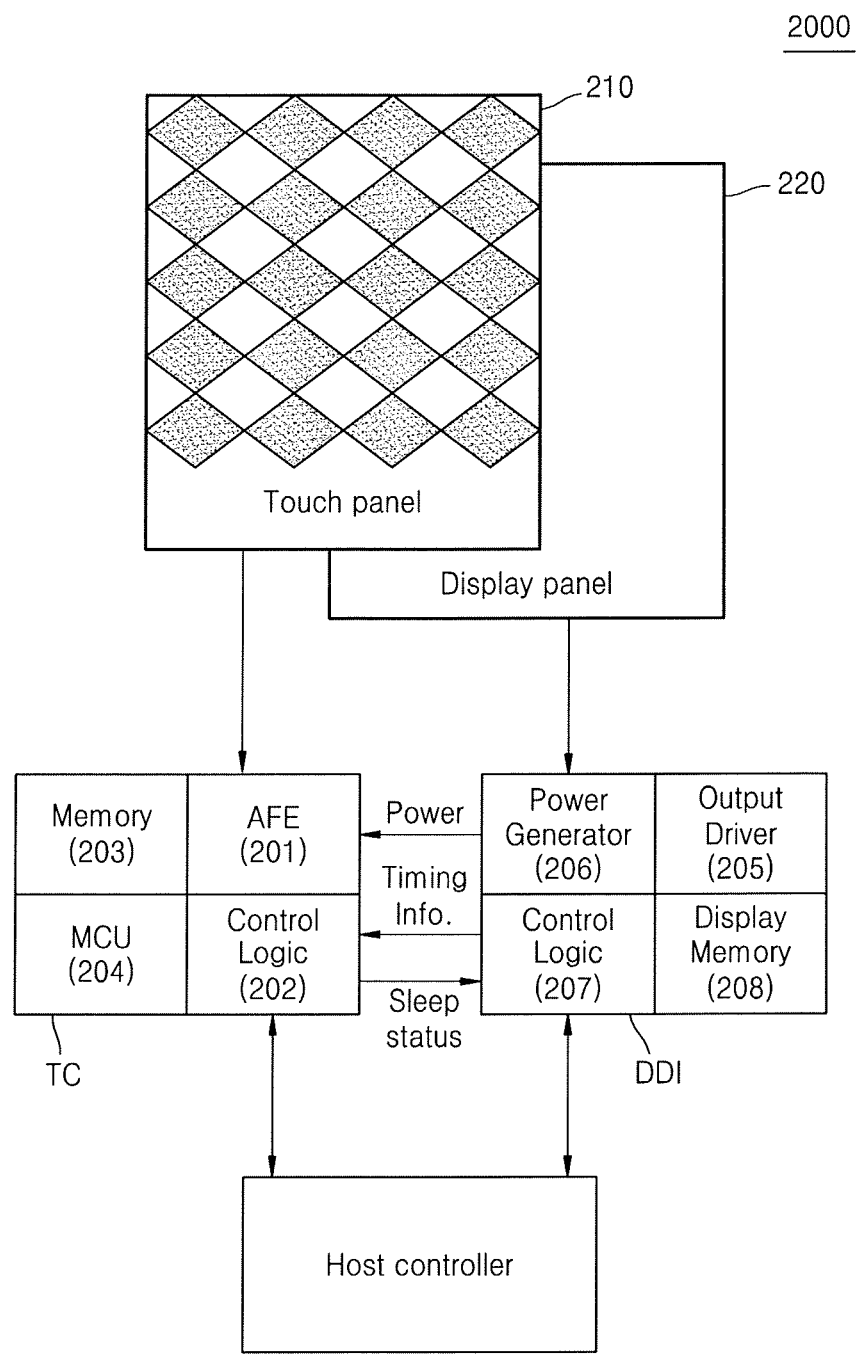
FIG. 22 is a block diagram illustrating a touch screen device including a touch controller according to an exemplary embodiment of the inventive concept.

FIG. 22 is a block diagram illustrating a touch screen device 2000 including a touch controller TC according to an exemplary embodiment of the inventive concept.

Referring to FIG. 22, the touch screen device 2000 includes a touch panel 210, a display panel 220, a touch controller TC controlling the touch panel 210, and a display driving circuit DDI controlling the display panel 220.

The touch controller TC includes an analog front end (AFE) 201, a touch control logic 202, a memory 203, and a micro control unit (MCU) 204 (e.g., a microcontroller). In an embodiment, the AFE 201 is a set of analog signal conditioning circuitry that uses operational amplifiers, filters, and sometimes application-specific integrated circuits. The AFE 201 may include the driving signal transmitter 110 and the sensing signal receiver 120 of FIG. 1. The AFE 201 may sense a touch input on the touch panel TP, and generate touch data. The memory 203 may store touch data. The touch control logic 202 and the MCU 204 may correspond to the control logic 130 of FIG. 1. The touch control logic 202 may control an operation of the AFE 201 and an overall operation of the touch controller TC. The MCU 204 may calculate touch coordinates by using touch data output from the AFE 201 or using touch data stored in the memory 203.

The display driving circuit DDI includes an output driver 205, a power generator 206, a display memory 208, and display control logic 207. The output driver 205 may include a source driver providing a grayscale voltage to a source line of the display panel 220 and a gate driver scanning a gate line of the display panel 220. The display memory 208 may store display data received from a host processor in units of frames. The display memory 208 may be referred to as a frame buffer. The power generator 206 may generate power voltages used in the display driving circuit DDI. Also, the power generator 206 may generate power voltages used in the touch controller TC. The display control logic 207 may control an overall operation of the display driving circuit DDI.

As illustrated in FIG. 22, the touch controller TC and the display driving circuit DDI may transmit or receive to or from each other at least one piece of information such as timing information, status information, and sleep status information. The sleep status information may indicate whether the touch controller is in a sleep mode (e.g., a low power mode). Also, the touch controller TC and the display driving circuit DDI may provide or receive a power voltage to or from each other.

According to an exemplary embodiment, the touch controller TC and the display driving circuit DDI are integrated into a single semiconductor chip. According to an exemplary embodiment, the touch controller TC and the display driving circuit DDI are integrated into separate semiconductor chips and a transmission channel for transmission and reception of information is between the two chips.

Figure 23:
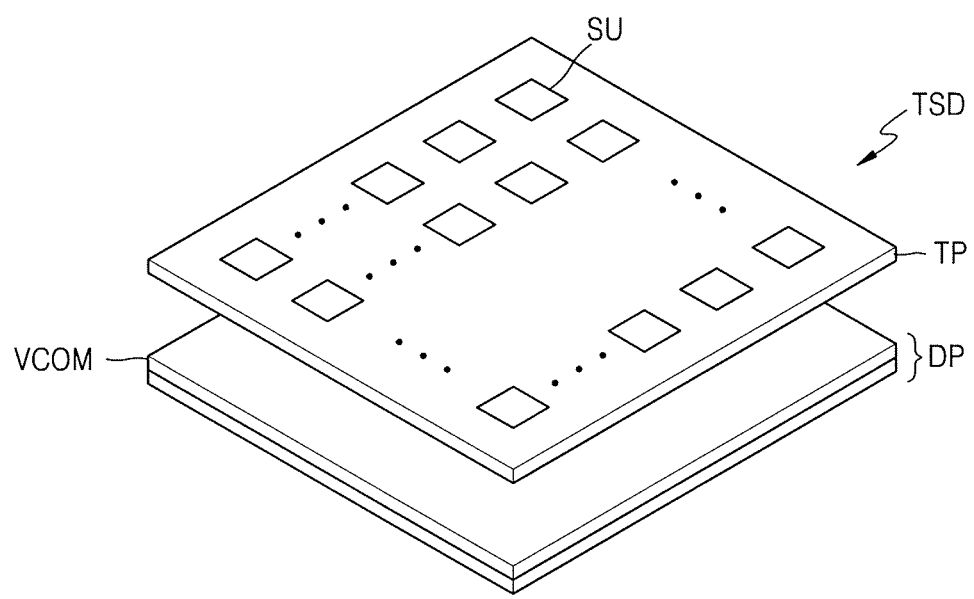
FIG. 23 illustrates a touch panel and a display panel included in the touch screen device of FIG. 22.

FIG. 23 illustrates a touch panel TP and a display panel DP included in the touch screen device TSD of FIG. 22. The display panel DP may be a liquid crystal display (LCD), a light emitting diode (LED) display, an organic LED (OLED) display, an active-matrix OLED (AMOLED) display, and a flexible display, or other various types of flat panel displays.

In terms of process or price competitiveness, the touch panel TP may be integrated to the display panel DP. In FIG. 23, the touch panel TP is disposed on the display panel DP. However, the structure is not limited thereto, and the touch panel TP may also be disposed under the display panel DP. The touch panel TP may be spaced apart from the display panel DP by a predetermined distance or attached to an upper plate of the display panel DP.

As illustrated in FIG. 23, the display panel DP is an on-cell type and is a separate panel or layer from the touch panel TP, but the inventive concept is not limited thereto. According to an exemplary embodiment, the display panel DP is an in-cell type and includes display pixels and a sensing unit SU formed in the same layer. The display panel DP may receive a common voltage VCOM from an external source.

Figure 24:
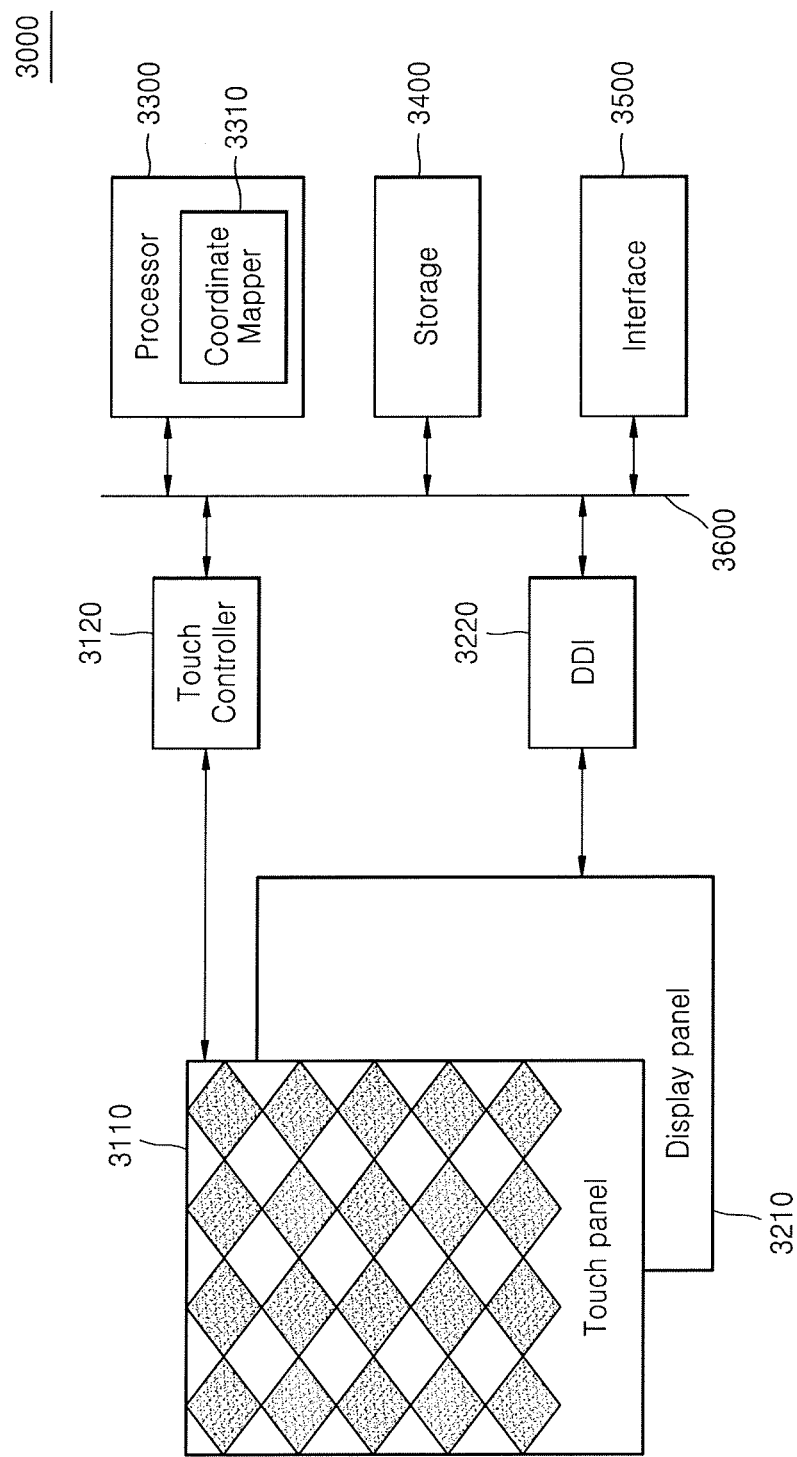
FIG. 24 is a block diagram illustrating a touch screen system according to an exemplary embodiment of the inventive concept.

FIG. 24 is a block diagram illustrating a touch screen system 3000 according to an exemplary embodiment of the inventive concept.

The touch screen system 3000 according to an exemplary embodiment of the inventive concept is an electronic device including an image display function. For example, the electronic device may include at least one of a smartphone, a tablet personal computer (PC), a mobile phone (e.g., smartphone), a video phone, an e-book reader, a desktop PC, a laptop PC, a netbook computer, a personal digital assistant (PDA), a portable multimedia player (PMP), a MP3 player, mobile medical equipment, a camera, a wearable device (e.g., a head-mounted-device (HMD) such as electronic glasses), electronic clothing, an electronic bracelet, an electronic necklace, electronic appcessory, electronic tattoo, and a smart watch.

According to an exemplary embodiment, the touch screen system is a smart home appliance having an image display function. For example, the smart home appliance may include at least one of a television, a digital video disk (DVD) player, an audio device, a refrigerator, an air conditioner, a cleaner, an oven, a microwave oven, an air cleaner, a set-top box, a TV box (e.g., SAMSUNG HOMESYNC, APPLE TV, or GOGGLE TV), game consoles, electronic dictionary, electronic keys, camcorders, or electronic frames.

According to an exemplary embodiment, the touch screen system may include at least one of various medical equipment, a navigation device, a global positioning system (GPS) receiver), an event data recorder (EDR), a flight data recorder (FDR), an automobile infotainment device, shipping electronic equipment (e.g., navigation devices and gyrocompass or the like), avionics, security equipment, head units for vehicles, industrial or home robots, automatic teller's machine (ATM) of financial institutions or point of sales (POS) of shops.

According to an exemplary embodiment, the touch screen system may include at least one of furniture or a part of a building or a structure, an electronic board, an electronic signature receiving device, a projector, and various measurement equipment (e.g. water supply, electricity, gas, or radiowave measurement equipment), that include an image display function. The electronic device including the touch screen system according to various exemplary embodiments of the inventive concept may be one or combination of the above-described various devices. Also, the touch screen system may be a flexible device. However, the inventive concept is not limited to the above-described devices.

Referring back to FIG. 24, the touch screen system 3000 includes a touch panel 3110, a display panel 3210, a touch controller 3120, a display driving circuit 3220, a processor 3300, a storage device 3400, an interface 3500, and a bus 3600.

The touch panel 3110 is configured to sense a touch event generated at each point. The display panel 3210 may be configured as various types of panels that are configured to display an image. The touch panel 3110 and the display panel 3210 may be integrally formed to overlap each other.

The touch controller 3120 may control an operation of the touch panel 3110 and transmit an output of the touch panel 3110 to the processor 3300. The touch controller 3120 is the touch controller 100 (see FIG. 1) according to an exemplary embodiment of the inventive concept described above. The touch controller 3110 may encode and modulate an input signal based on a code signal and a carrier signal to generate a driving signal, and may sense a touch input generated in the touch panel 3110 based on the driving signal.

The display driving circuit 3220 controls the display panel 3210 so as to display an image on the display panel 3210. While not illustrated, the display driving circuit 3220 may include a source driver, a grayscale voltage generator, a gate driver, a timing controller, a power supply unit, and an image interface. Image data to be displayed on the display panel 3210 may be stored in the storage device 3400 via the image interface 3500, and may be converted to an analog signal by using grayscale voltages generated by using the grayscale voltage generator. The source driver and the gate driver may drive the display panel 3210 in response to a vertical synchronization signal and a horizontal synchronization signal provided by the timing controller.

The processor 3300 may execute commands and control an overall operation of the touch screen system 3000. Program coding or data required by the processor 3300 may be stored in the storage device 3400. The interface 3500 may communicate with a predetermined external device and/or system.

The processor 3300 may include a coordinates mapping unit 3310. Positions on the touch panel 3110 and positions on the display panel 3210 may be mapped with each other, and the coordinates mapping unit 3310 may extract corresponding coordinates of the display panel 3210 corresponding to a touch point on the touch panel 3110 where a touch input is generated. A user may perform an input action such as touching, dragging, pinching, stretching, and a single touch or multiple touches to select and control icons, menu items, or images displayed on the display panel 3210, based on the coordinates mapping between the touch panel 3110 and the display panel 3210.

Figure 25:
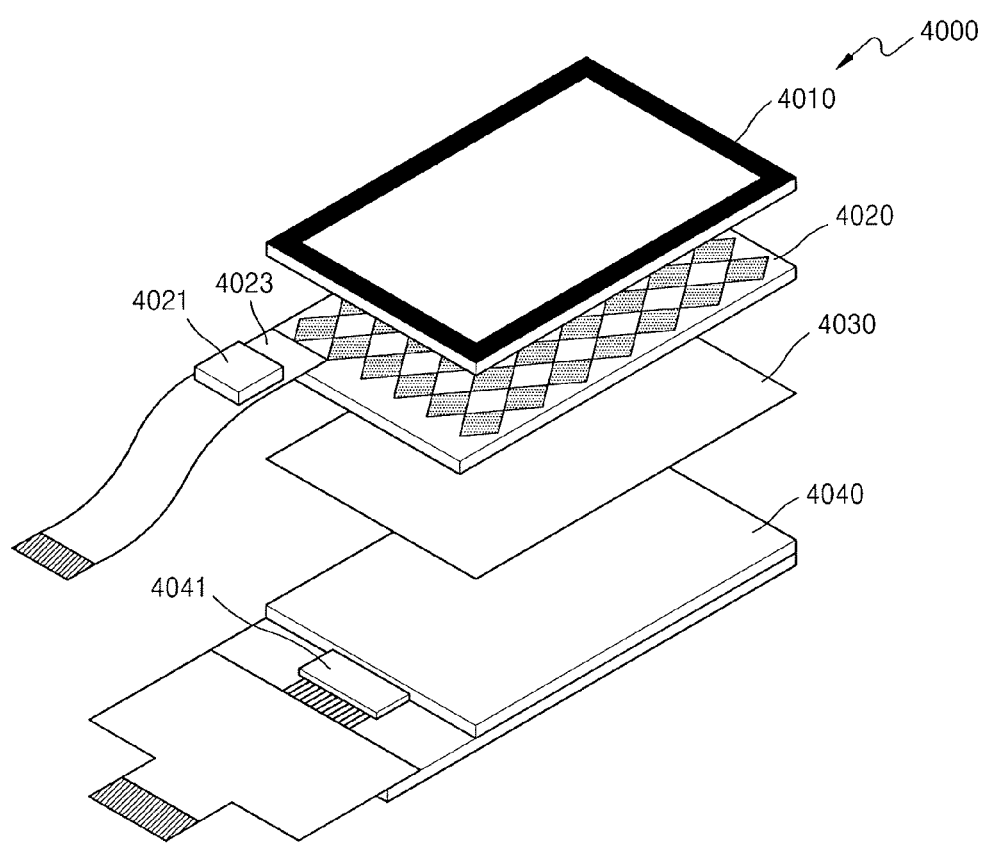
FIG. 25 illustrates a touch screen module including a touch sensing device according to an exemplary embodiment of the inventive concept.

FIG. 25 illustrates a touch screen module 4000 including a touch sensing device according to an exemplary embodiment of the inventive concept.

Referring to FIG. 25, the touch screen module 4000 include a window glass 4010, a touch panel 4020, and a display panel 4040. Also, a polarizing plate 4030 may be disposed between the touch panel 4020 and the display panel 4040 to improve optical characteristics.

The window glass 4010 may be formed of an acryl or reinforced glass so as to protect the touch screen module 4000 from external impact or scratches due to repeated touches.

The touch panel 4020 may be formed by patterning a transparent electrode such as an indium tin oxide (ITO) on a glass substrate or a polyethylene terephthalate (PET) film.

The touch controller 4021 may be mounted on a flexible printed circuit board (FPCB) in the form of a chip on board (COB), and may sense a touch event on the touch panel 4020 to extract touch coordinates and provide the touch coordinates to a host controller.

The display panel 4040 is typically formed by bonding two glasses as an upper plate and a lower plate. The display panel 4040 includes a plurality of pixels to display image frames. According to an exemplary embodiment, the display panel 4040 may be a liquid crystal panel. However, the inventive concept is not limited thereto, as the display panel 4040 may include various types of display devices. For example, the display panel 4040 may be one of an organic light emitting diode (OLED), an electrochromic display (ECD), a digital mirror device (DMD), an actuated mirror device (AMD), a grating light valve (GLV), a plasma display panel (PDP), an electro luminescent display (ELD), a light emitting diode (LED) display, and a vacuum fluorescent display (VFD).

The display driving integrated circuit 4041 may be mounted on a printed circuit board as a COG as illustrated. However, the structure is exemplary, and the display driving circuit 4041 may be mounted in other various forms such as a chip on film (COF) or a chip on board (COB). While the display driving integrated circuit 4041 is illustrated as a single chip in the present exemplary embodiment, this is merely for convenience of illustration, and a plurality of display driving integrated chips may also be mounted. Also, the touch controller 4021 may be integrated into a single semiconductor chip with the display driving circuit 4041.

Figure 26A:
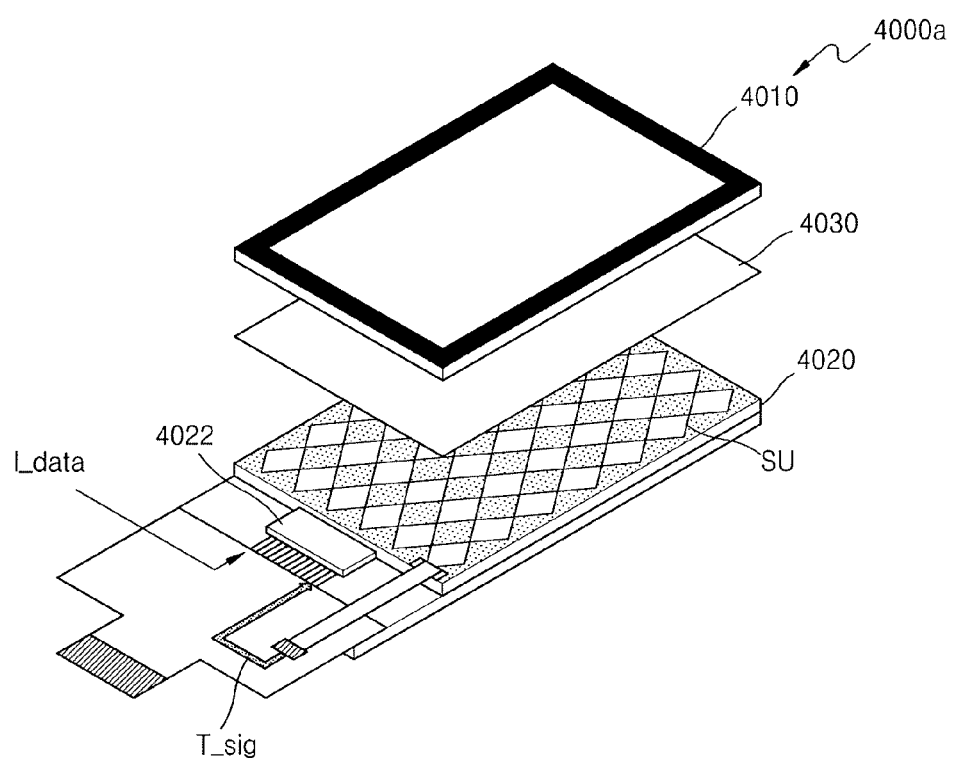
FIGS. 26A and 26B illustrate a structure of a touch screen module in which a touch panel and a display panel are integrated.
Figure 26B:
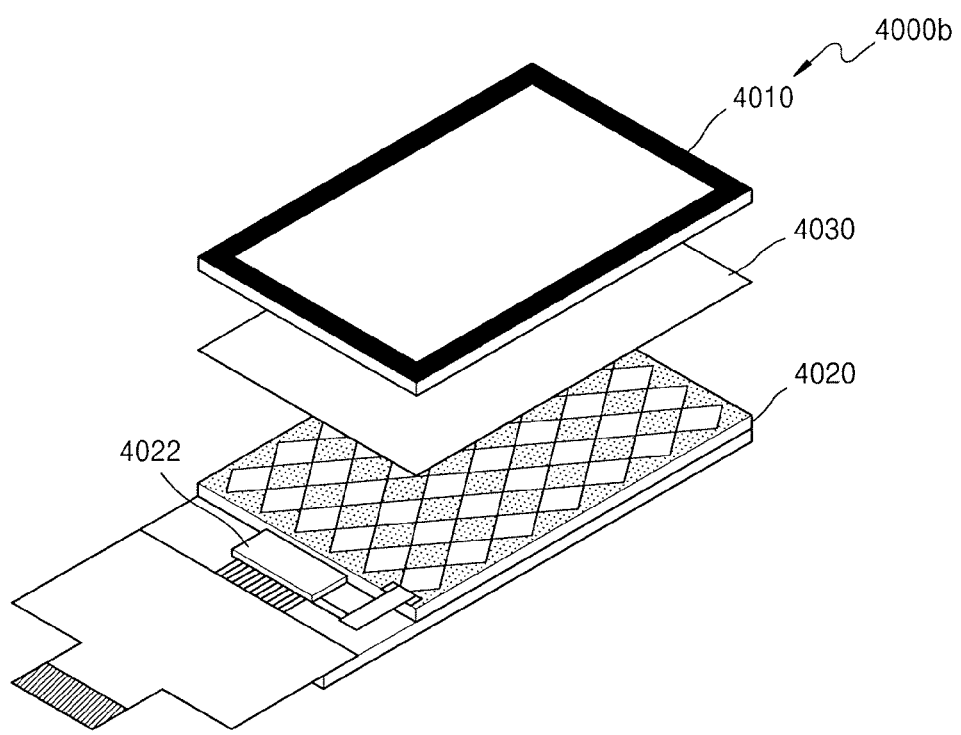

FIGS. 26A and 26B illustrate a structure of a touch screen module 4000a in which a touch panel and a display panel are integrated. As illustrated in FIG. 26A, the touch screen module 4000a includes a window glass 4010, a display panel 4020, and a polarizing plate 4030. In particular, in regard to formation of the touch panel, the touch panel is not formed on an additional glass substrate but formed by patterning a transparent electrode on an upper plate of the display panel 4020. FIG. 26A illustrates that a plurality of sensing units SU are formed on an upper plate of the display panel 4020. Also, when a panel structure as described is formed, a touch controller and a display driving circuit may be integrated into the single semiconductor chip 4022.

When the touch controller and the display driving circuit are integrated into the single semiconductor chip 4022, a voltage signal T_sig from a sensing unit SU and image data I_data from an external host are provided to the semiconductor chip 4022. Also, the semiconductor chip 4022 may process the image data I_data to generate grayscale data to drive an actual display device, and provides the grayscale data to the display panel 4020. To this end, the semiconductor chip 4022 may include a pad related to touch data T_data and pad related to the image data and grayscale data (not shown). The semiconductor chip 4022 may receive a touch data voltage signal T_sig from the sensing unit SU via a conductive line connected to a side of the touch panel. When disposing the pads on the semiconductor chip 4022, in order to reduce data noise, the pad that receives the touch data voltage T_sig may be disposed close to the conductive line via which the voltage signal T_sig is to be transmitted. While not illustrated in FIG. 26A, if a conductive line for providing grayscale data to a display panel is disposed opposite the conductive line which the touch data voltage signal T_sig is transmitted, the pad for providing the grayscale data may also be disposed opposite the pad that receives the voltage signal T_sig.

The touch screen module 4000b of FIG. 26B has an approximately similar structure to the touch screen module 4000a. However, a voltage signal from the sensing unit SU is not provided to the semiconductor chip 4022 via a FPCB but directly to the semiconductor chip 4022 via a conductive line.

Figure 27:
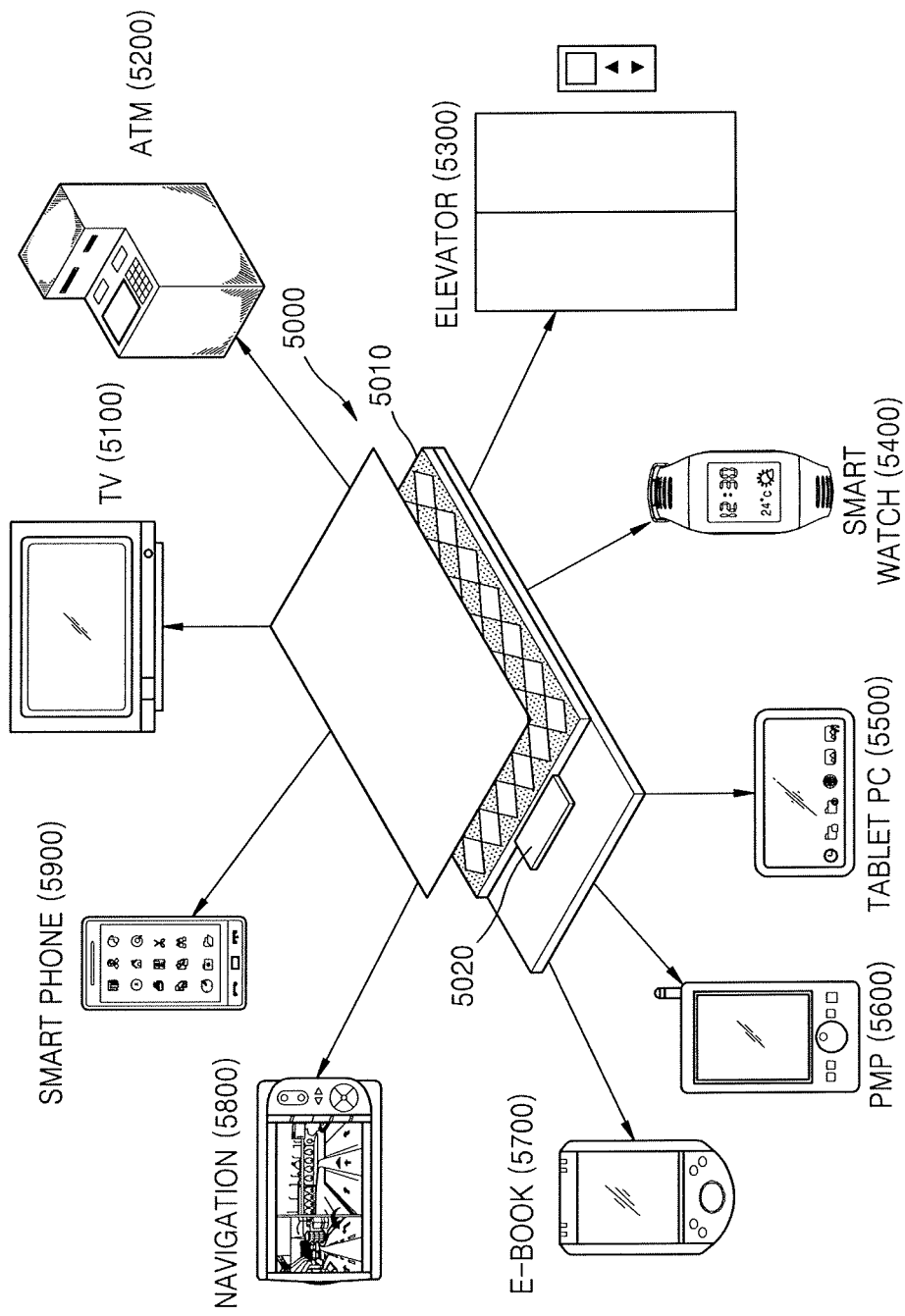
FIG. 27 illustrates application examples of various electronic products in which a touch sensing device according to an exemplary embodiment of the inventive concept is mounted.

FIG. 27 illustrates application examples of various electronic products in which a touch sensing device 5000 according to an exemplary embodiment of the inventive concept is mounted. The touch sensing device 5000 may be used in various electronic products. The touch sensing device 5000 may be used in a smartphone 5900, a TV 5100, an automatic teller machine (ATM) 5200, an elevator 5300, a smart watch 5400, a tablet PC 5500, a PMP 5600, an e-book reader 5700, or a navigation device 5800.

While the inventive concept has been particularly shown and described with reference to exemplary embodiments thereof, it will be understood that various changes in form and details may be made therein without departing from the spirit and scope of the inventive concept.

What is claimed is:

1. A touch controller comprising:
   a driving signal transmitter configured to generate a driving signal by spreading a frequency of an input signal to a first frequency and a second frequency, wherein the first frequency is higher than a preset carrier frequency, and the second frequency is less than the carrier frequency, and to input the driving signal to a touch panel; and
   a sensing signal receiver configured to receive a sensing signal generated in the touch panel based on the driving signal and generate touch data based on the sensing signal.

2. The touch controller of claim 1, wherein a difference between the carrier frequency and the first frequency is equal to a difference between the carrier frequency and the second frequency.

3. The touch controller of claim 1, wherein the driving signal transmitter is further configured to encode the input signal based on a code signal having a third frequency so that a frequency of the input signal is spread in a positive direction and a negative direction due to the third frequency.

4. The touch controller of claim 3, wherein the driving signal transmitter is further configured to vary a code interval of the code signal to correspond to the third frequency.

5. The touch controller of claim 3, wherein the code signal comprises a first signal and a second signal having a negative value with respect to a value of the first signal.

6. The touch controller of claim 1, wherein the driving signal transmitter comprises:
   an encoder configured to generate an encoding signal by encoding the input signal based on a code signal having a third frequency; and
   a modulator configured to modulate the encoding signal based on a carrier signal having the carrier frequency.

7. The touch controller of claim 6, wherein the driving signal transmitter further comprises a pulse shaper configured to change a waveform of the encoding signal.

8. The touch controller of claim 1, wherein the sensing signal receiver comprises:
   a correlator circuit configured to remove a component of the carrier frequency from the sensing signal and generate a touch signal having a logic level selected from among M logic levels, wherein M is a natural number equal to or greater than 2; and
   a decoder configured to decode the touch signal based on a code signal having a third frequency to generate the touch data.

9. The touch controller of claim 8, wherein the sensing signal receiver further comprises a pulse window circuit configured to synthesize the touch signal and a preset pulse waveform.

10. The touch controller of claim 1, further comprising control logic configured to determine a frequency of noise input to the touch panel based on the touch data and determine a frequency difference between the carrier frequency and the first frequency and a frequency difference between the carrier frequency and the second frequency such that the frequency of the noise is removed.

11. The touch controller of claim 10, wherein the control logic is further configured to select one of a plurality of preset frequencies as the frequency difference based on the frequency of the noise.

12. The touch controller of claim 1, wherein the touch controller is formed on a same semiconductor chip or module as a display driving circuit configured to drive a display panel.

13. A touch sensing method comprising:
- generating a driving signal by spreading a frequency of an input signal to a first frequency and a second frequency, wherein the first frequency is higher than a preset carrier frequency, and the second frequency is less than the carrier frequency;
- sensing a touch on a touch panel based on the driving signal to generate a sensing signal; and
- generating touch data based on the sensing signal received from the touch panel.

14. The touch sensing method of claim 13, wherein the generating of a driving signal comprises:
- encoding an input signal based on a code signal having a preset frequency to generate an encoding signal; and
- modulating the encoding signal based on a carrier signal.

15. The touch sensing method of claim 14, wherein the generating of a driving signal further comprises shaping the encoding signal by changing a waveform of the encoding signal.

16. The touch sensing method of claim 14, wherein the generating of touch data comprises:
- decoding the sensing signal based on the code signal to generate a decoding signal; and
- demodulating the decoding signal based on the carrier signal.

17. The touch sensing method of claim 13, wherein the generating of touch data comprises separating a touch signal from the sensing signal via a match filter having a transfer function corresponding to a transfer function of the driving signal.

18. A touch controller for a touch panel, the touch controller comprising:
- a receiver configured to receive a sensing signal from the touch panel and derive touch data from the sensing signal;
- a noise analysis circuit configured to determine an amount of noise in the touch data;
- a frequency adjustment circuit configured to change a dodging frequency when the amount is equal to or greater than a reference amount and otherwise maintains the dodging frequency; and
- a transmitter configured to perform a frequency spreading on an input signal using the dodging frequency to generate a driving signal for application to the touch panel.

19. The touch controller of claim 18, wherein the frequency spreading spreads a frequency of the input signal to a first frequency and a second frequency, wherein the first frequency is higher than a preset carrier frequency, and the second frequency is less than the carrier frequency.

20. The touch controller of claim 19, wherein a difference between the carrier frequency and the first frequency is equal to a difference between the carrier frequency and the second frequency.

* * * * *